US009140308B2

(12) United States Patent
Schröder et al.

(10) Patent No.: US 9,140,308 B2
(45) Date of Patent: Sep. 22, 2015

(54) CLUTCH ARRANGEMENT

(71) Applicants: Arthur Schröder, Dittelbrunn (DE); Jörg Sudau, Niederwerrn (DE); Daniel Pittner, Gerbrunn (DE)

(72) Inventors: Arthur Schröder, Dittelbrunn (DE); Jörg Sudau, Niederwerrn (DE); Daniel Pittner, Gerbrunn (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 14/376,055

(22) PCT Filed: Jan. 8, 2013

(86) PCT No.: PCT/EP2013/050194
§ 371 (c)(1),
(2) Date: Jul. 31, 2014

(87) PCT Pub. No.: WO2013/113527
PCT Pub. Date: Aug. 8, 2013

(65) Prior Publication Data
US 2014/0367215 A1 Dec. 18, 2014

(30) Foreign Application Priority Data
Feb. 2, 2012 (DE) .......... 10 2012 201 507

(51) Int. Cl.
*F16D 43/28* (2006.01)
*F16D 13/40* (2006.01)
*F16D 25/0635* (2006.01)
*F16D 25/12* (2006.01)

(52) U.S. Cl.
CPC ............ *F16D 13/40* (2013.01); *F16D 25/0635* (2013.01); *F16D 25/12* (2013.01); *F16D 25/123* (2013.01)

(58) Field of Classification Search
CPC ....... F16D 13/40; F16D 25/12; F16D 25/123; F16D 25/0635
USPC ............... 192/85.24, 55.61, 85.29, 85.61, 192/85.37–85.39
See application file for complete search history.

(56) References Cited

U.S. PATENT DOCUMENTS

| 4,371,066 | A * | 2/1983 | Fujioka et al. | ............. 192/85.34 |
| 7,458,453 | B2 * | 12/2008 | Bruckner et al. | ......... 192/85.39 |
| 8,109,376 | B2 * | 2/2012 | Bek | ............................ 192/70.22 |

(Continued)

FOREIGN PATENT DOCUMENTS

| EP | 1577575 | 9/2005 |
| EP | 1754905 | 2/2007 |
| EP | 1798435 | 6/2007 |
| WO | WO2011/045199 | 4/2011 |

*Primary Examiner* — David J Hlavka
(74) *Attorney, Agent, or Firm* — Cozen O'Connor

(57) ABSTRACT

A clutch arrangement for a drivetrain of a vehicle comprises a first friction surface, a second friction surface and a pressing element. The first and second friction surfaces are arranged to be movable relative to each other along an axis of rotation of the clutch arrangement. The first and second friction surfaces are formed that they can be brought into a frictional engagement with each other to make a torque transmittable from the first friction surface to the second friction surface. One of the first and the second friction surfaces is arranged at a component part. The pressing element comprises a spring structure and is configured to produce or sever the frictional engagement upon actuation by causing a force along the axis of rotation. The spring structure is configured and arranged to at least partially cause the force on the component part through a change in shape.

20 Claims, 10 Drawing Sheets

(56) References Cited

U.S. PATENT DOCUMENTS

| | | | |
|---|---|---|---|
| 8,123,014 B2 * | 2/2012 | Wooden | 192/48.613 |
| 8,220,605 B2 * | 7/2012 | Krause et al. | 192/3.3 |
| 8,534,440 B2 * | 9/2013 | Sudau et al. | 192/85.29 |
| 2006/0207853 A1 * | 9/2006 | Ackermann et al. | 192/3.29 |
| 2006/0266614 A1 * | 11/2006 | Maguire et al. | 192/85 AA |
| 2007/0039796 A1 * | 2/2007 | Schroder et al. | 192/85 AA |
| 2007/0240965 A1 * | 10/2007 | Ito | 192/85 AA |
| 2008/0006501 A1 * | 1/2008 | Haupt et al. | 192/70.12 |

* cited by examiner

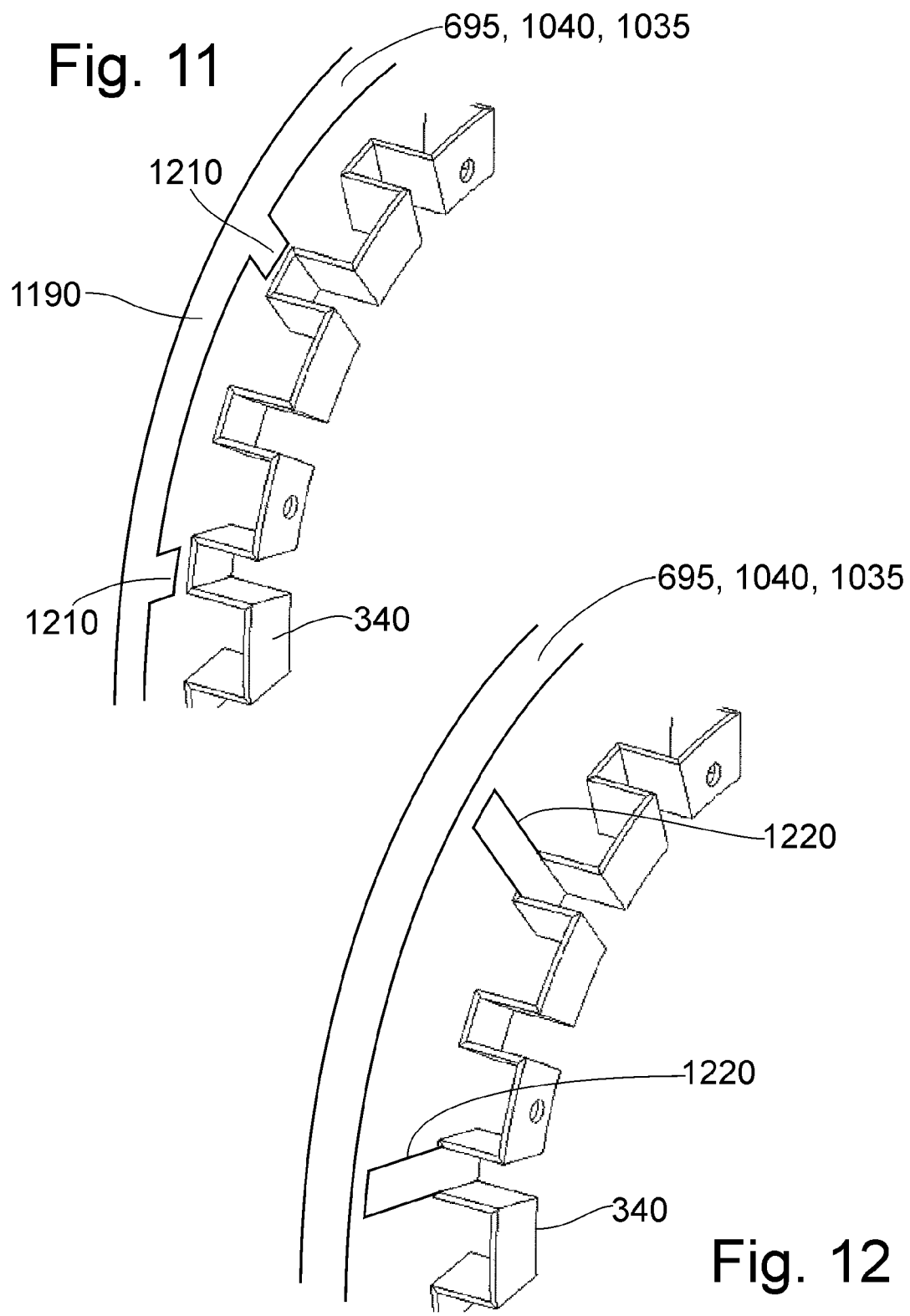

CLUTCH ARRANGEMENT

CROSS-REFERENCE TO RELATED APPLICATIONS

This is U.S. national stage of PCT Application No. PCT/EP2013/050194, filed on Jan. 8, 2013, which claims priority to German Patent Application No. DE 10 2012 201 507.8, filed on Feb. 2, 2012, each of which is hereby incorporated in its entirety by reference.

FIELD OF INVENTION

The subject matter disclosed in the specification is directed to a clutch arrangement such as can be used, for example, in a drivetrain of a vehicle, for example, of a motor vehicle.

DESCRIPTION OF THE RELATED ART

Clutches are used in a wide variety of forms in the vehicle sector, particularly in the motor vehicle sector. They are often utilized within the framework of a drivetrain of a vehicle of the above-mentioned type for transmitting torque and are used, for example, between a drive unit, i.e., an engine, for example, and a downstream transmission. In this way, it is possible to separate the drivetrain such that the engine can continue to run even when the vehicle is at a standstill, for example. In this case, that is, the clutch separates the rotating engine output shaft from a stationary transmission input shaft.

Clutches can also be used in other configurations in the drivetrain of a vehicle. For example, in the case of hybrid drives, they can also be used between two different drive units or for alternately separating and coupling different drive units in connection with a transmission input shaft. In this regard, clutches can be used in connection with different drive unit technologies, for example, internal combustion engines and electric motors, and in combination with different transmission techniques. For example, they can be used in cooperation with synchronized as well as non-synchronized transmissions. The transmissions in question can also be manually shifted transmissions or automatic transmissions in which gears can be changed manually, where appropriate, via electric, electronic or other control pulses.

Clutches are often based on producing a frictionally engaging contact between corresponding component parts which are coupled with a drive component and with an output component of the relevant clutch. It is precisely in case of sharply diverging rotational speeds such as can occur, for example, during starting, that energy is converted into heat in the area of the relevant friction surfaces, which can lead to an unwanted heating of the relevant friction surfaces or of the relevant component parts. For this reason, clutches are used in which, for example, oil circulates in the interior of a housing, the heat generated at the friction surfaces being at least partially removed from the friction surfaces by this oil.

The subject matter disclosed in German Patent Application No. DE 10 2009 016 414 A1 is directed to a clutch arrangement in which a corresponding oil flow is built up in a housing of the clutch arrangement. The subject matter disclosed in German Patent Application No. DE 101 25 628 A1 is also directed to a clutch arrangement in which at least one friction member for generating a frictionally engaging connection is formed such that oil circulates around it. The transmission of torque is carried out via the friction members.

When the frictionally engaging contact is produced between the corresponding component parts comprising the friction surfaces, a pressing force which is the basis of the frictionally engaging contact is generated along a force direction. In reality, it is often difficult to prevent an irregular distribution of force perpendicular to the force direction. Accordingly, based on the real, active pressing forces, there is an effective friction radius or pressing force radius at which, mathematically idealized, the pressing force acts or is effective.

By nature of its construction, a change can come about in the distribution of force during engagement or other changes in the operating condition of the clutch. Accordingly, precisely when there are differences in rotational speed at the relevant friction surfaces, i.e., in the slip condition of the clutch, the mechanical load on the friction surfaces may change drastically. The effective friction radius or effective pressing force radius provides at least one reference point where a maximum load can occur at the friction surfaces.

Therefore, as a result of a change occurring in the friction radius during operation, wear on the friction surfaces can also be subjected to a change, for example, a loading of the corresponding components. These components can also be subjected to other mechanical loads, possibly through additional radially acting forces or force components, which can lead to, or contribute to, unwanted effects. Accordingly, it may happen that individual components of the clutch tend to tilt during operation.

SUMMARY OF THE INVENTION

Therefore, there is a need to limit a change in the effective friction radius or effective pressing force radius.

This need is met by a clutch arrangement according to patent claim 1.

According to one embodiment, a clutch arrangement, for example, for a drivetrain of a vehicle, comprises a first friction surface and a second friction surface which are arranged to be movable relative to each other along an axis of rotation of the clutch arrangement and are formed in such a way that they can be brought into a frictional engagement with each other to make a torque transmittable from the first friction surface to the second friction surface, the first friction surface or the second friction surface being arranged at a component part.

The clutch arrangement further comprises a pressing element which is configured to produce or sever the frictional engagement upon actuation by causing a force along the axis of rotation, wherein the pressing element comprises a spring structure which is configured and arranged to at least partially cause a force on the component part through a change in shape. The pressing element further comprises a pressing structure which is formed such that it limits a change in shape of the spring structure.

Embodiment examples of a clutch arrangement are based on the insight that a change in the effective friction radius or effective pressing force radius can be limited in that the change in shape of the spring structure is limited by providing the pressing structure. Due to its inherent ability to change shape and the increase in pressing force typically associated with this, the spring structure which can serve, for example, to improve the engagement behavior of the clutch arrangement makes possible a softer engagement, but the change in shape of the spring structure often leads precisely to the above-described change in the effective friction radius. Accordingly, the pressing structure of the pressing element in particular makes it possible to limit the change in friction radius by limiting the change in shape of the spring structure responsible for this, but without significantly impairing the engagement behavior of the clutch arrangement by dispensing with the spring structure and/or without requiring substantial additional installation space along the axis of rotation (axial direction).

In one embodiment, the spring structure can comprise a flexible spring structure, for example, a leaf-spring type, disk-spring type, disk-spring-segment type, diaphragm-spring type or diaphragm-spring-segment type structure which is configured to cause the force through a bending along the axis of rotation. Particularly in a spring structure of this type in which the exertion of force is based on a bending along the axis of rotation, a change in the effective friction radius with the negative consequences described above is frequently brought about precisely because of the lever geometry inherent in a spring structure of this kind.

In general, the expressions "effective friction radius" and "effective pressing force radius" may be used synonymously here even when they basically refer to force components or forces in perpendicular relationship to each other. Accordingly, the expression "effective friction radius" is often used in connection with force components acting tangentially or in circumferential direction of the clutch arrangement, since these force components contribute to the actual torque transmission. In contrast, the pressing forces act substantially in axial direction, i.e., along the axis of rotation, and are therefore substantially perpendicular to the tangential force components. However, since in many cases there is, to a close approximation, a linear relationship between the tangentially transmittable forces of the frictional engagement and the pressing force on which the frictional engagement is based, the expressions "effective pressing force radius" and "effective frictional force radius" can generally be used synonymously.

Both are given by a weighting of the radius values at which the corresponding tangential forces or axial forces are present at the friction surfaces, this weighting being carried out via the respective force related to the relevant point. Thus a product of the effective pressing force radius and the total pressing force transmitted via the friction surfaces corresponds to a summation or integration of the products of the respective radius value of a point under consideration and the pressing force existing at this point.

The summation or integration is carried out over the whole surface area of the first friction surface or second friction surface, at points of which the corresponding pressing force comes into partial contact, or via which points this pressing force is transmitted. The respective radius value specifies the distance of the relevant point from the axis of rotation, while the pressing force represents the force component acting along the axis of rotation. Regardless of this, the effective friction radius can be defined analogously when the tangential force components which are transmitted between the first friction surface and second friction surface or are present at the latter are used instead of the pressing forces.

In one embodiment, the first friction surface and the second friction surface can have a common contacting surface which is at least ring-segment-shaped and has the largest surface area, the first friction surface and the second friction surface contacting each other at this contacting surface when the frictional engagement is present, and in which the pressing structure is formed such that, by limiting the change in shape of the spring structure in a predefined condition of the clutch arrangement, there results an effective friction radius which is at a distance from an at least arcuate center line of the contacting surface of at most 40% of a width of the contacting surface.

The contacting surface is substantially uninterrupted but can also have interruptions, for example, channels allowing a fluid medium to flow through. The contacting surface is at least ring-segment-shaped, i.e., it can also be annular, for example. Accordingly, due to its at least ring-segment-shaped configuration, the contacting surface has an inner radius and an outer radius such that the width of the contacting surface is given by a difference of the two radii mentioned above, i.e., as a difference of the outer radius and the inner radius of the contacting surface. The arcuate center line extends along the arithmetic center of the inner radius and outer radius, i.e., at a radius value corresponding to one half of the sum of the inner radius and outer radius. The predefined condition can be, for example, an unworn condition of the clutch arrangement or an as-new condition of the clutch arrangement. However, it can also be a maintenance condition or other predefined condition.

Accordingly, in one embodiment, it may be possible to realize an effective friction radius that is close to the arcuate center line of the contacting surface, i.e., often close to the center line of the two friction surfaces, precisely when the change in shape is limited by the pressing structure. In this way, for example, in case of a clutch arrangement which is cooled by a fluid medium, it may be possible to improve the removal of heat but also to improve wear behavior even if there should still be a difference in rotational speed between the two friction surfaces during an engagement of the pressing structure. Accordingly, in other embodiment examples, this effect can be further improved where applicable when the aforementioned friction radius is at a distance from the arcuate center line of the contacting surface of at most 30%, at most 25%, at most 20%, at most 15%, or at most 10% of the width of the contacting surface.

In one embodiment, the spring structure and the pressing structure can be formed such that the spring structure at least partially transmits the force to the component part also when the pressing structure limits the change in shape of the spring structure. Accordingly, it may be possible to allow a more uniform loading of the pressing element and both components thereof, namely, the pressing structure and spring structure, even in a completely engaged state or when the pressing structure limits the change in shape of the spring structure. This can also lead to an improved cooling or to an improvement in the wear behavior of the clutch arrangement.

In a clutch arrangement of this type according to one embodiment, the spring structure and the pressing structure can also be formed such that the spring structure substantially completely transmits the force to the component part when the pressing structure limits the change in shape of the spring structure. Accordingly, it may be possible where applicable to prevent an abrupt change in the friction radius or pressing force radius when the pressing structure limits the change in shape of the spring structure.

In one embodiment, the pressing structure can be formed such that the pressing structure comes in contact with the spring structure when the spring structure reaches a predetermined degree of shape change to limit the change in shape of the spring structure. The degree of shape change can be, for example, the degree of a bending of the spring structure. Accordingly, it may be possible to better define or set the friction radius or pressing force radius when the change in shape of the spring structure is limited by the pressing structure.

In a clutch arrangement of this type according to one embodiment, the pressing structure can have a projection which faces the spring structure and which is formed such that the pressing structure comes in contact with the spring structure with the projection. Specifically, this can make it possible to define the friction radius or pressing force radius by positioning the projection. Accordingly, a distance of the projection from the axis of rotation can substantially determine the effective friction radius or effective pressing force.

In one embodiment, the spring structure and pressing structure can substantially contact each other along a substantially line-shaped contact when the pressing structure limits the shape change of the spring structure. In this way, it may be possible to define the friction radius or pressing force radius in a more accurate manner.

In one embodiment, the pressing element further comprises a connection portion which is configured to form a mechanical connection between the spring structure and pressing structure. In a clutch arrangement of this type, a first distance along the axis of rotation between the spring structure and the component part at the level of the connection structure can correspond at least to a smallest second distance between the pressing structure and the spring structure in a substantially relaxed condition of the spring structure in which the spring structure touches the component part and is connected to the connection portion. In other embodiment examples, the first distance can also be greater than the second distance. Accordingly, it may be possible where applicable to save on installation space along the axis of rotation, i.e., along axial direction of the clutch arrangement, or to implement a space-saving design.

In one embodiment, the spring structure can be formed by a separate spring element, for example, a contact disk spring. In this case, the pressing element can have a shoulder which is formed and arranged such that the spring element contacts the shoulder to transmit force at least partially to the component part. Accordingly, in one embodiment of this type, the connection structure can comprise the shoulder, for example. It may be possible where applicable to adapt the mechanical characteristics of the spring structure to the planned area of application of the clutch arrangement in a more purposeful manner through separate implementation of the spring element as spring structure. Precisely in a construction of this kind, a limiting of the axial installation space by the configuration described above can be advantageous with respect to the first distance and second distance.

In one embodiment, the pressing structure can be formed and arranged such that the pressing structure contacts the component part when the pressing structure limits the change in shape of the spring structure. In this way, it may be possible where applicable to achieve an additional support or enlargement of the area of contact between the pressing element and component part. In this way, it may be possible to achieve a more uniform distribution of force when the pressing structure limits the change in shape of the spring structure.

In one embodiment, the first friction surface and second friction surface can be formed to contact a fluid medium in operation. The pressing element further comprises a conveying surface (330) for the fluid medium, which conveying surface is formed in such a way that it causes a flow of fluid medium during a rotation relative to the fluid medium. In this way, it may be possible to bring about a flow of fluid medium in the clutch arrangement that can contribute, for example, to the removal of heat generated at the first friction surfaces and second friction surfaces. A cooling of the clutch arrangement can be improved in this way.

In a clutch arrangement of this type according to one embodiment, the pressing element can be formed such that the conveying surface and the spring structure are formed integrally. In this way, it may be possible to cause the fluid medium to be conveyed at least partially through the component part which comprises both conveying structure and conveying surface. Accordingly, it may be possible to implement a structurally simpler solution. The conveying surface and spring structure can be formed from a sheet-like workpiece, for example.

In one embodiment, the first friction surface and second friction surface can be formed to contact a fluid medium in operation. It may further comprise a conveying component having at least one conveying surface, which conveying surface can be formed such that it causes a flow of fluid medium during a rotation relative to the fluid medium. In this way, it may be possible to bring about a flow of fluid medium in the clutch arrangement that can contribute, for example, to the removal of heat generated at the first friction surfaces and second friction surfaces. A cooling of the clutch arrangement can be improved in this way.

In a clutch arrangement of this type according to one embodiment, the spring structure can be formed by a separate spring element, for example, a contact disk spring. The conveying component and/or the spring element can be formed such that the spring element can be centered via the conveying component. This can facilitate assembly and, therefore, production of the clutch arrangement. In addition or alternatively, it may also be possible to further improve an operation of the clutch arrangement in that it may be possible to exchange radial forces between the conveying component and the spring element due to the ability to carry out centering.

In one embodiment, the conveying surface can be formed and arranged such that it is part of a toothing via which the first friction surface can be driven. In other words, the conveying surface can engage with a component part at which the first friction surface is formed or which has the first friction surface, such that the component part is set in rotation during a rotational movement of the conveying component or pressing element. Accordingly, the pressing element or conveying component can likewise serve to drive the first friction surface.

In one embodiment with a conveying surface, the conveying surface can be oriented substantially perpendicular to a tangential direction which is perpendicular to the axis of rotation and a radial direction facing away perpendicularly from the axis of rotation. In this way, it may be possible to reduce an occurrence of axial forces and/or to improve a conveying of the fluid medium.

In one embodiment, the spring structure can have a first pressing surface and the pressing structure can have a second pressing surface, the first pressing surface being arranged at a side of the spring structure facing the component part and being formed such that the first pressing surface contacts the component part and the force is at least partially caused via the first pressing surface whenever the pressing element produces the frictional engagement. The second pressing surface can be arranged at a side of the pressing structure facing the component part and can be formed such that the second pressing surface contacts the component part and the force is at least partially caused via the second pressing surface when the pressing structure limits the change in shape of the spring structure.

Accordingly, when the frictional engagement is produced by the pressing element, the first pressing surface of the spring structure is always in contact with the component part, while the second pressing structure additionally contacts the component part when the pressing structure limits the change in shape of the spring structure. Accordingly, the force can be provided at least partially continuously via the first pressing surface in this way. The second pressing surface participates when the change in shape of the spring structure is limited by the pressing structure.

In a clutch arrangement of this type according to one embodiment, the pressing element can be formed such that a total area of the projections of the first pressing surface and second pressing surface substantially completely comprises a projection of an overlapping area of the first friction surface and second friction surface. In other words, the pressing element can provide the force for producing the frictional engagement over an area that is greater than the overlapping area of the first friction surface and second friction surface. Therefore, the first friction surface and second friction surface are pressed one upon the other in a more uniform manner so that a change in the friction radius can be further limited.

The first pressing surface and the second pressing surface can also be formed of multiple parts, in which case the corresponding pressing surfaces can be formed by all of these parts or possibly only by a plurality of these parts. The corresponding parts of the first pressing surfaces and/or second pressing surfaces can be distributed to a plurality of pressing structures or spring structures, for example. In some embodiments, a clutch arrangement can also correspondingly comprise a plurality of pressing structures and/or spring structures, the quantities of which need not match but may differ.

In a clutch arrangement of this type according to one embodiment, the pressing structure and the spring structure can be formed in one piece. This may facilitate production of the clutch arrangement. Alternatively or in addition, it may also be possible to conserve installation space in axial direction, i.e., along the axis of rotation.

In a clutch arrangement of this type according to one embodiment, the pressing structure and the spring structure can be fashioned from a sheet-like component part, wherein the spring structure is constructed by forming out of the sheet-like component part. In this way, it may be possible to further simplify production.

In one embodiment with the first pressing surfaces and second pressing surfaces described above, the first pressing surface and second pressing surface can be formed in such a way that the pressing element contacts the component part substantially along the whole circumference thereof at the level of the effective friction radius thereof when the pressing structure limits the change in shape of the spring structure. A uniform distribution of force along the circumference of the clutch arrangement can be achieved in this way so that variations in the effective friction radius or effective pressing force radius can be reduced along the circumference.

By "one-piece component" is meant herein a component that is fashioned from exactly one contiguous piece of material. Therefore, "one-piece" can be used synonymously with the expressions "integral" or "of one part".

In this regard, a non-positive connection or frictionally engaging connection is brought about by static friction, a bonding connection is brought about by molecular or atomic interactions and forces, and a positively engaging connection is brought about by geometric connection of the relevant mating parts. Accordingly, the static friction generally presupposes a normal force component between the two mating parts.

The clutch arrangement according to one embodiment can be, for example, a single-disk clutch, a two-disk clutch or—generally speaking—a multidisk clutch. For example, it can be a starting clutch in connection with a non-synchronized transmission (e.g., automatic transmission) or a separating clutch in connection with a synchronized transmission.

BRIEF DESCRIPTION OF THE DRAWINGS

Embodiment examples will be described and explained more fully in the following referring to the accompanying drawings, in which:

FIG. 11 shows a perspective view of a further embodiment form of the further component part and of a spring element of a clutch arrangement in accordance with one embodiment of the present invention; and FIG. 12 shows a perspective view of a further embodiment form of the further component part and of a spring element of a clutch arrangement in accordance with one embodiment of the present invention.

Identical or comparable components are denoted by identical reference numerals in the following description of the accompanying drawings.

Figure 1:
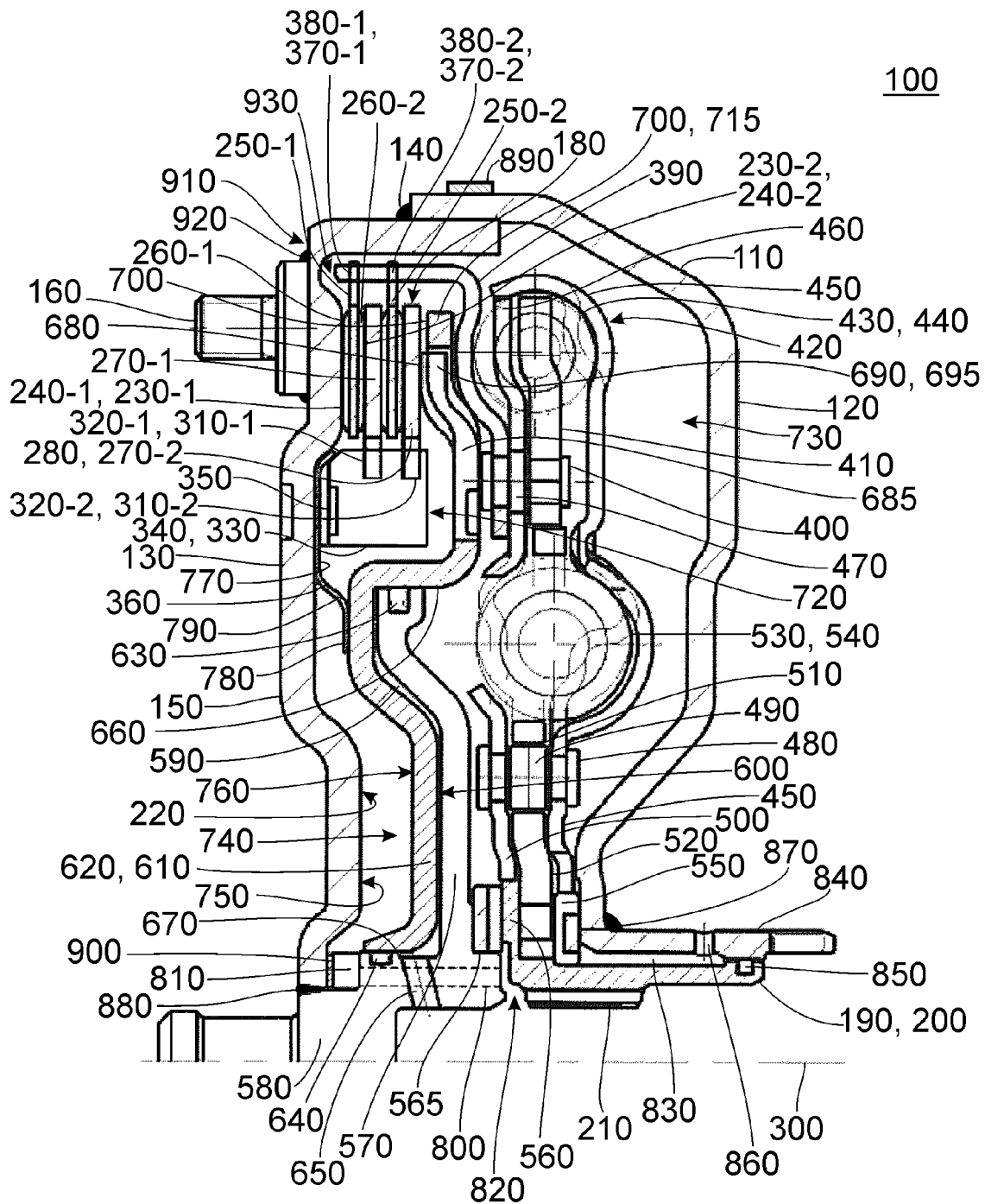
FIG. 1 shows a cross section through a clutch arrangement in accordance with one embodiment of the present invention.

Further, collective reference numerals are used for components and objects which occur more than once in one embodiment or diagram but which are described collectively with respect to one or more features.

Components or objects which are denoted by identical reference numerals or collective reference numerals may be constructed identically or also differently with respect to one or more or all features, for example, their dimensions, unless otherwise explicit or implicit from the description.

DETAILED DESCRIPTION OF THE PRESENTLY PREFERRED EMBODIMENTS

FIG. 1 shows a cross section through a clutch arrangement 100 according to one embodiment. The clutch arrangement 100 can be used, for example, in a drivetrain of a vehicle, for example, to convey a torque supplied by a drive unit to a transmission or to another component in a separable manner. Therefore, the clutch arrangement 100 can be used, for example, as a separating clutch when combined with a synchronized transmission or as a starting clutch in combination with a non-synchronized transmission, for example, a corresponding automatic transmission.

Clutch arrangement 100 comprises a housing 110 which is constructed in the present instance as a two-part housing with a first housing shell 120 and a second housing shell 130. The second housing shell 130 is also referred to as engine-side cover of clutch arrangement 100. The two housing shells 120, 130 are connected to each other via a weld connection 140.

Housing 110 can accordingly be filled, or is filled, with a fluid medium, for example, an oil or other liquid which is suitable for absorbing and carrying off heat occurring in the interior of housing 110.

In the clutch arrangement 100 shown in FIG. 1, second housing shell 130 and, therefore, housing 110 serve as drive component 150. To this end, second housing shell 130 has a weld bolt 160 for fastening to a flexplate or to a flywheel of a drive unit, for example, of an engine, or to another component of the drivetrain. Alternatively, a stud or other fastening structure for fastening the clutch arrangement 100 can be implemented instead of the weld bolt 160.

Specifically, the clutch arrangement 100 shown in FIG. 1 is a multidisk clutch or multiplate clutch. Correspondingly, clutch arrangement 100 has in an interior space of the housing 110 a friction pack 180 having a plurality of first friction surfaces 230 and second friction surfaces 240. The first friction surfaces are coupled with the drive component 150 or housing 110 to be at least substantially fixed with respect to rotation relative to it via components which will be described in the following, and the second friction surfaces 240 are coupled with an output component 190 of the clutch arrangement to be at least substantially fixed with respect to rotation relative to it. Specifically, output component 190 is a lower hub 200 which can be coupled by positive engagement with a transmission input shaft, not shown in FIG. 1, via an internal toothing 210. The transmission input shaft has an external toothing corresponding to internal toothing 210.

In one embodiment of a clutch arrangement 100 shown in FIG. 1, friction pack 180 comprises a first friction surface 230-1 which is formed at an inner surface 220 of housing 110 or of second housing shell 130 and which is in frictional engagement, or can be brought into frictional engagement, with a corresponding second friction surface 240-1 of an outer plate 250-1. Outer plate 250 is lined with a friction facing 260-1 at which second friction surface 240-1 is formed. In contrast, first friction surface 230-1 is formed directly at the inner surface 220 of housing 110, i.e., for example, as a steel surface, when housing 110 is also fashioned from steel.

Outer plate 250-1 has at a side remote of inner surface 220 an additional friction facing 260-2 which forms an additional second friction surface 240-2 at an upper surface. Second friction surface 240-2 is in frictional engagement with an inner plate 270-1, or can be brought into frictional engagement with the latter, via a corresponding first friction surface 230-2.

Further, friction pack 180 has an additional outer plate 250-2 and an additional inner plate 270-2. Outer plate 250-2 also has corresponding friction facings 260 which, like the first and second friction surfaces 230, 240, are not provided with reference numerals in FIG. 1 for the sake of clarity. Outer plate 250-2 is arranged between the two inner plates 270-1 and 270-2. Friction pack 180 is accordingly limited by inner plate 270-2 at a side remote of inner surface 220 of housing 110.

Inner plates 270 and outer plates 250 are implemented as substantially disk-shaped steel component parts and form corresponding, at least partially disk-shaped component parts at which first friction surfaces 230 and second friction surfaces 240, respectively, are arranged in the region of the disk-shaped portions. As will be described further in the following, inner plate 270-2 constitutes component part 280 with which a piston 610, which serves as pressing element 620 and comprises the latter, makes contact to produce the frictional engagement between first friction surfaces 230 and second friction surfaces 240. Friction facings 260 can also be provided at the other respective component parts in other embodiment examples.

Inner plates 270 and outer plates 250 have in each instance a central recess with respect to an axis of rotation 300, inner plates 270 and outer plates 250 being arranged to be rotatable exactly around axis of rotation 300. Therefore, axis of rotation 300 also represents the axis of rotation of the clutch arrangement 100 in a mathematical sense and is also referred to as axial direction.

To allow torque to be transmitted from the housing 110 serving as drive component 150 to the inner plates 270, inner plates 270 have in each instance a portion 310-1, 310-2 at which a driver surface 320-1, 310-2 is formed at a lateral face, inner plates 270 engaging in each instance with a conveying surface 330 of a conveying component 340 via these driver surfaces 320-1, 320-2 such that, when conveying component 340 rotates, the respective inner plates 270 are also set in rotation.

Conveying component 340 is substantially annularly shaped and extends around axis of rotation 300 along a circumference of clutch arrangement 100. In one embodiment shown in FIG. 1, conveying component 340 is substantially meander-shaped such that conveying surfaces 330 run substantially perpendicular to a circumferential direction of clutch arrangement 100, i.e., substantially perpendicular to a tangential direction, this tangential direction being perpendicular to axis of rotation 300 and to a radial direction facing away from axis of rotation 300 in the corresponding cross-sectional plane.

Specifically, conveying component 340 has a plurality of conveying surfaces 330. These conveying surfaces 330 are evenly arranged, for example, along the circumference of conveying component 340. Correspondingly, portions 310 of inner plate 270 also have a corresponding quantity of driver surfaces 320 with which the plurality of conveying surfaces 330 engage. Conveying component 340 and portions 310 of inner plates 270 accordingly form teeth which mesh with each other. In this way, the torque to be transmitted can be distributed to a greater quantity of conveying surfaces 330 and driver surfaces 320 such that it may be possible where applicable to transmit a correspondingly higher torque to inner plates 270 and, therefore, through clutch arrangement 100 according to one embodiment.

Conveying component 340 is connected to a sealing element 360 and second housing shell 130 to be fixed with respect to rotation relative to the latter and in a positively engaging manner via a rivet connection 350. Accordingly, via rivet connection 350 and, as the case may be, via sealing element 360, a rotational movement of drive component 150, i.e., housing 110, is transmitted to conveying component 340 and, therefore, to conveying surfaces 330. Torque is accordingly transmitted to inner plates 270 using the engagement of inner plates 270 with conveying component 340 via conveying surfaces 330 and driver surfaces 320.

Outer plates 250 also have portions 370-1 and 370-2 which engage via corresponding further driver surfaces 380 with a support 390, also referred to as outer plate support, and in case a frictional engagement is provided, receive the torque transmitted from inner plates 270 to outer plates 250.

Support 390 has a substantially pot-shaped structure with a central recess and is coupled with a first hub disk 410 of a two-stage vibration damper 420 via a rivet connection 400. First hub disk 410 is coupled with support 390 via a spacer 500. Spacer 500 is formed as part of rivet connection 400 but can also be formed separately from the latter.

Vibration damper 420 has a plurality of first spring elements 430 which are arranged along a circumference of first hub disk 410 and contact the latter by one end in each instance. First spring elements 430 are implemented as helical springs 440. The helical springs 440 or first spring elements 430 contact a first cover plate 450, also designated as right-hand cover plate based on the arrangement shown in FIG. 1, by the other respective end. First cover plate 450 is connected to a second cover plate 460, also designated as left-hand cover plate, via a spacer 490. Together, the latter form an unclosed housing for the damper element 430. The second cover plate 460 leads radially inward in one piece.

Rivet connection 400 and spacer 500 by which support 390 is connected to first hub disk 410 of vibration damper 420 is guided through ring-segment-shaped elongated hole 470 which defines a maximum movement amplitude of the two cover plates 450, 460 relative to first hub disk 410 and, therefore, to support 390.

Second cover plate 460 extends in radial direction appreciably farther than first cover plate 450 extends in direction toward axis of rotation 300. Accordingly, first cover plate 450 is mechanically connected via an additional rivet connection 480 and spacer 490 to second cover plate 460 to be fixed with respect to rotation relative to it. Spacer 490 extends through an elongated hole 510, which is also shaped like a ring segment, into a second hub disk 520. Second hub disk 520 and first cover plate 450 are coupled with each other via second spring elements 530 which are also implemented again in this case as helical springs 540. Second cover plate 460 accordingly leads in one piece radially inward via the second spring set with second spring elements 530.

In some embodiment, other spring elements can also be used as first spring elements 430 and second spring elements 530. For example, barrel springs or elastomer-based spring elements can also be used insofar as suited to technical constraints, i.e., particularly the chemical and/or thermal constraints existing in housing 110.

Second hub disk 520 is further connected to the lower hub 200, i.e., to output component 190, to be fixed with respect to rotation relative to it. In this case also, a rivet connection can be used, for example. However, other connection techniques, for example, positively engaging, frictionally engaging and/or bonding connection techniques, can also be used. For example, second hub disk 520 and lower hub 200 can be welded together. In addition or alternatively, however, plug-in connections can also be implemented. Accordingly also instead of the other rivet connections described above, they can be realized additionally or alternatively as plug-in connections or using other connection techniques.

The torque is transmitted from outer plates 250 via support 390 and first hub disk 410 via spring elements 430 to cover plates 450, 460. From the latter it is further conveyed via second spring elements 530, via second hub disk 520 and lower hub 200 to the transmission input shaft, not shown in FIG. 1, when the first friction surfaces 230 and second friction surfaces 240 engage with each other.

In one embodiment shown in FIG. 1, second hub disk 520 is supported opposite first housing shell 120 to be rotatable with respect to axis of rotation 300 using a bearing 550, specifically in the present case using an axial friction bearing. At the side of second hub disk 520 remote of bearing 550, second hub disk 520 is supported against a portion 560 of lower hub 200 which is in turn supported via an additional bearing 565 to be rotatable around axis of rotation 300 with respect to a dividing wall 570. The further bearing 565 is also an axial friction bearing in one embodiment shown in FIG. 1.

Dividing wall 570 is part of a front hub 580 and defines a piston pressure space 590 at least on one side. This piston pressure space 590 is limited along axial direction, i.e., along axis of rotation 300, by a piston face 600 of a piston 610. As will be shown in the further description, piston 610 forms the pressing element 620 which is configured and arranged to bring first friction surfaces 230 and second friction surfaces 240 into frictional engagement with one another upon actuation.

In other embodiment examples, pressing element 620 can also be configured to sever the frictional engagement. However, as will also be illustrated in more detail in the following description, the clutch arrangement shown in FIG. 1 is a normally open clutch in which there is no frictional engagement or only a slight frictional engagement in pressureless condition, i.e., in the absence of actuation. In one embodiment shown here, pressing element 620 is configured to bring first friction surfaces 230 and second friction surfaces 240 into frictional engagement with each other upon actuation.

Piston pressure space 590 is sealed using two sealing elements 630 and 640 relative to pressing element 620 on the one hand and front hub 580 on the other hand. To fill the piston pressure space with a corresponding pressurized medium which can be, for example, the same fluid medium with which the rest of housing 110 can also be filled, front hub 580 has an inlet bore 650 to piston pressure space 590 which fluidically joins piston pressure space 590 with a region of the central recess which faces second housing shell 130 and in which the transmission input shaft is also arranged.

To allow a movement of pressing element 620 along rotational direction 300, the two sealing elements 630, 640 are arranged in each instance in a corresponding groove in dividing wall 570 and front hub 580 and are oriented such that they contact a corresponding sealing surface 660 and 670 of pressing element 620 extending along rotational direction 300.

Pressing element 620 extends along radial direction, i.e., proceeding from axis of rotation 300, perpendicular to the latter to the level of inner plates 270 and outer plates 250. Pressing element 620 has in this region a first pressing surface 680 which faces first friction surfaces 230 and second friction surfaces 240, i.e., outer plates 250 and inner plates 270.

In one embodiment shown in FIG. 1, first pressing surface 680 is formed by a cropping of pressing element 620 by which a piston tongue 690 is formed, this piston tongue 690 presenting toward first friction surfaces 230 and second friction surfaces 240 opposite the pressing element 620 in this region. Accordingly, piston tongue 690, which is also referred to as nose, is connected to pressing element 620 via a piece of material from which pressing element 620 is fashioned, i.e., for example, a steel or other metal material, and therefore has a smaller spring constant compared to pressing element 620. Accordingly, piston tongue 690 (spring structure 695) is connected to the rest of pressing element 620 via a connection portion 685. Rather than an individual spring structure 695 or piston tongue 690, a plurality of corresponding spring structures 695 or piston tongues 690 may be implemented in embodiment examples. Accordingly, the clutch arrangement 100 shown in FIG. 1 has a plurality of piston tongues 690 which are arranged to be distributed along the circumference of the clutch arrangement. The arrangement can be uniform or irregular.

Accordingly in one embodiment of a clutch arrangement 100 shown in FIG. 1, piston tongue 690 forms a spring structure 695 which is configured and arranged such that, through a change in shape, it at least partially exerts on component part 280 the force via which the pressing element produces or severs the frictional engagement when actuated. The spring structure 695 is a flexible spring structure which is formed as a leaf spring in the present case.

Piston tongue 690 contacts a back side of inner plate 270-2, i.e., component part 280, via first pressing surface 680 such that the back side of inner plate 270-2 also forms the back side of component part 280. The back side of component part 280 is located opposite first friction surface 230 of inner plate 270-2 and is arranged on the side remote of the latter. Pressing element 620 is accordingly formed using piston tongue 690 to generate a pressing force or force in direction of first friction surfaces 230 and second friction surfaces 240 via first pressing surface 680 of pressing element 620, by which pressing force the frictional engagement can be produced therebetween. Because of the decreased spring constant compared to the rest of pressing element 620, a softer engagement can be possible, if required, by providing first pressing surface 680 at piston tongue 690.

Beyond this, however, pressing element 620 further has a second pressing surface 700 which is formed at a portion 710 of pressing element 620 rather than at piston tongue 690. Accordingly, portion 710 forms a pressing structure 715 via which the change in shape of the piston tongue 690 is limited in the present embodiment example in that the pressing structure 715 contacts component part 280 via second pressing surface 700 parallel to first pressing surface 680 when piston tongue 690 has reached a degree of shape change, i.e., bending, such that second pressing surface 700 contacts component part 280. An increase in the pressing force is accordingly distributed to the first pressing surface 680 and second pressing surface 700. In this embodiment example, the pressing force is at least partially continuously transmitted from piston tongue 690 to component part 280.

With respect to its spring characteristics, i.e., for example, its spring constants, portion 710 differs appreciably less from the other regions of pressing element 620 than is the case with piston tongue 690, for example. The spring constant of portion 710 is typically appreciably greater than that of piston tongue 690, i.e., for example, is at least two times, at least five times, or at least ten times greater.

It should also be mentioned here that piston tongue 690 extends only over a limited angular area. Accordingly, portion 710 and, therefore, second pressing surface 700 includes areas at the same height as first pressing surface 680.

In one embodiment shown here, piston tongue 690 and pressing structure 715 are connected to each other via connection portion 685. Pressing structure 715 and piston tongue 690 are formed integrally from a sheet-like piece of material.

If pressing element 620 is now moved along axis of rotation 300 to first friction surfaces 230 and second friction surfaces 240, that is, moved to the left referring to FIG. 1, a comparatively soft engagement is initially carried out via first pressing surface 680 of piston tongues 690. If pressing element 620 is moved farther, the change in shape (deformation) of piston tongue 690 increases and the pressing force exerted via first pressing surface 680 on plates 250, 270 and, therefore, on the corresponding friction surfaces 230, 240 is greater. If pressing element 620 is moved sufficiently far to cause the pressing force via second pressing surface 700 of portion 710, i.e., reaches the aforementioned degree of shape change of piston tongue 690, an appreciably higher, virtually surging pressing force is possibly transmitted to friction surfaces 230, 240.

Apart from elastic deformations of pressing element 620 and possibly of friction facings 260, the pressing element is now in an end condition in which clutch arrangement 100 is completely engaged with respect to the path traveled by pressing element 620. A further increase is also still possible in this region through a corresponding increase in a force driving pressing element 620 in direction of first friction surfaces 230 and second friction surfaces 240 but without significant movement of pressing element 620.

While first pressing surface 680 generally continues to remain in contact with inner plate 270-2 in the above-described transition from first pressing surface 680 to second pressing surface 700, it transmits substantially smaller forces compared to second pressing surface 700, these forces resulting from the ratio of the corresponding spring constants of piston tongue 690 and of that of portion 710. In this condition, pressing element 620 substantially contacts inner plate 270-2 along the entire circumference of pressing element 620.

To prevent, or at least limit, a change in an effective pressing radius or effective friction radius during an engagement of clutch arrangement 100, surface center points or effective contact points of the relevant two pressing surfaces 680, 700 can substantially coincide in the embodiment of the pressing element 620 shown in FIG. 1 taking into account the corresponding counterpart component, i.e., in the present instance taking into account inner plate 270-2. Further, in the implementation of pressing element 620 shown in FIG. 1, a pressing surface can be increased. In this way it may be possible where applicable to transmit a greater pressing force because of the higher surface.

The effective friction radius $r_m$, which is often also referred to simply as friction radius, or the effective pressing force radius $r_m$, which is often likewise referred to simply as pressing force radius, is given here by a summation or integration of radius values r of points at the first friction surface 230 and second friction surface 240 at which a pressing force or friction force F(r, φ) is present. Here the locally occurring forces F(r, φ) are used as weighting factors. With angular coordinate φ which represents an angle in relation to axis of rotation 300, the effective friction radius or pressing force radius is given by $$r_m = \frac{\int_A r\, dF}{\int_A dF} = \frac{\int\int_A r^2 F(r, \varphi)\, dr\, d\varphi}{\int\int_A F(r, \varphi) r\, dr\, d\varphi}$$

Value A here denotes an overlapping area or the projection thereof along axis of rotation 300 of first friction surface 230 and second friction surface 240, while dF indicates an integration over the locally occurring forces F(r, φ). Even when friction radius and pressing force radius basically refer to different forces, namely, on the one hand, tangentially acting forces for transmitting a torque and, on the other hand, axially acting pressing forces, they can be used synonymously in general because the maximum transmittable tangential forces are proportional to the pressing forces (normal forces) because of the existing frictional engagement.

A shifting of the effective pressing force radius could lead to a change in the existing pressure ratios at the first friction surfaces 230 and second friction surfaces 240, which pressure ratios can be brought about, for example, by an elasticity of friction facings 260 or of the relevant inner plates 270 and outer plates 250 and other component parts. Accordingly, a point on the friction surfaces 230, 240 at which a maximum heat can be transmitted because of the friction occurring during engagement can be displaced. Thus it may happen under certain circumstances that a cooling of the first friction surfaces 230 and second friction surfaces 240 through the aforementioned fluid medium in the interior of housing 110 is less efficient.

Also, a more irregular wear of friction facings 260 may be brought about. Further, due to the axial movability of inner plates 270 and outer plates 250, it can also happen under certain circumstances that a slight tilting of the plates 250, 270 comes about in the region of their respective teeth or meshing engagements with conveying component 340 and support 390 so that the corresponding effect may be further reinforced.

In one embodiment of a clutch arrangement 100 shown in FIG. 1, when the pressing structure 715 limits the shape change of the piston tongue 690 (spring structure 695), i.e., a gap previously existing between piston tongue 690 and portion 710 is bridged, the pressing element 620 accordingly contacts the friction radius $r_m$ substantially by its entire surface area, i.e., along the entire circumference. Accordingly, clutch arrangement 100 can make it possible to improve the friction radius at friction facings 260 in that piston tongues 690, also referred to simply as "tongues", are integrated in pressing element 620 at a defined distance from portion 710. Thus, compared with the embodiment with a separate spring element, a component part can be omitted under some circumstances.

Pressing element 620, outer plates 250, inner plates 270 and sealing element 360 at least partially limit a first volume 720 of an inner volume of clutch arrangement 100. As has already been mentioned briefly in connection with conveying component 340, conveying component 340 has the plurality of conveying surfaces 330 which do not only engage with the driver surfaces 320 of the inner plates 270; on the contrary, conveying surfaces 330 are also formed to cause a flow of the fluid medium in the interior of housing 110 when the conveying surfaces move relative to the fluid medium. To this end, conveying component 340 is connected to housing 110 serving as drive component 150 to be fixed with respect to rotation relative to it. In one embodiment shown in FIG. 1, conveying surfaces 330 are arranged not least in first volume 720 so that the fluid medium located in this first volume 720 is conveyed during a movement of conveying surfaces 330 relative to the fluid medium.

To allow the fluid medium to be conveyed as efficiently as possible, it may be advisable in this connection to allow the inner plates 270 to engage with conveying surfaces 330 of conveying component 340 via driver surfaces 320 such that a contacting surface between the relevant driver surfaces 320 and conveying surface 330 is at most 50% of a surface area of the conveying surface. Given a sufficient stability and force transmission or torque transmission to driver surfaces 320 via conveying surfaces 330, a further reduction in relation to the above-mentioned ratio may lead to an improved flow. It may be advisable in other embodiment examples, for example, to limit the above-mentioned ratio to at most 30%, at most 25%, at most 20%, at most 15%, or at most 10%. A lower limit for this ratio must be sought in the dual function of the conveying surface area on the one hand and the engagement surface area on the other hand.

As is shown in FIG. 1, conveying surfaces 330 are contiguous and flat. They are oriented along the circumferential direction or tangential direction, i.e., substantially perpendicular to axis of rotation 300 and radial direction facing away from the latter. This configuration can be advantageous as regards the torque-transmitting characteristics of conveying surfaces 330 because, in this way, axial forces along axis of rotation 300 can be reduced or even prevented via driver surfaces 320 on inner plates 270. But this configuration of conveying surfaces 330 can also be advantageous with respect to causing the flow of the fluid medium, i.e., for example, of an oil. For example, it may be possible in this way to cause a substantially radially outwardly directed flow of the fluid medium to first friction surfaces 230 and second friction surfaces 240.

The relevant plates 270, 250 or friction facings 260 which may be realized thereon can be formed in such a way that the flow of fluid medium can flow through them. To this end, the corresponding plates 250, 270 or the components connected thereto can have channels or fluid channels which allow the fluid medium to flow through along radial direction. These channels or fluid channels can be formed in a straight line, for example, but can also be formed in curved lines and can run in the region of friction surfaces 230, 240. Accordingly, friction energy or heat released precisely in the region of the friction surfaces 230, 240 can be discharged in close proximity to the fluid medium and carried away because of the existing flow.

In the cross-sectional plane shown in FIG. 1, conveying surface 330 has a cross-sectional surface which in turn comprises a significant proportion of a cross-sectional surface of second volume 740 in the relevant cross-sectional plane. In order to enable a conveying action of conveying component 340 which is as high as possible but is suited to circumstances, it may be advisable in embodiment examples of a clutch arrangement 100 to select the cross-sectional surface of first volume 720 in relation to the cross-sectional surface of conveying surface 330 such that it corresponds to at most 20 times, at most 15 times, at most 10 times, or at most 7.5 times the cross-sectional surface of conveying surface 330.

It may be possible to use even smaller factors in embodiment examples of a clutch arrangement. Indeed it is also possible to provide at most 5 times, at most 3 times, or at most 2 times more conveying surface 330 than cross-sectional surface of first volume 720. Larger multiples than those mentioned above can also occur in other embodiment examples.

To allow a corresponding supply of fluid medium to conveying surface 330, pressing element 620 has in radial direction at the level of conveying surfaces 330 or closer to axis of rotation 300 a passage 305, not shown in FIG. 1, which is also referred to as opening bore or through-opening. The through-opening is arranged radially outwardly of sealing element 360, i.e., opens into first volume 720. Accordingly, fluid medium can enter first volume 720 through the through-opening, not shown in FIG. 1, and is transported in first volume 720 radially outward through friction surfaces 230, 240 through conveying surfaces 330 which may be rotating relative to the fluid medium.

At the friction surfaces 230, 240, the flow of fluid medium enters a partial volume 730 of housing 110 in which vibration damper 420 is also arranged. In partial volume 730, the heat given off at the fluid medium can then be passed to other component parts, for example, housing 110. A portion of the fluid medium can then enter the first volume 720 again through the passage 305, not shown in FIG. 1, while an additional portion of the fluid medium can exit partial volume 730 through bearing 550. The dividing wall 570 separates partial volume 730 from piston pressure space 590.

The conveying action of conveying component 340 is based not least of all on the fact that a flow is imposed on the fluid medium when there is a difference in rotational speed between conveying component 340 and the fluid medium. Accordingly, the conveying component can make use of a relative movement between drive component 150 and output component 190 via the above-described rotationally fixed connection. A relative movement of this kind presents itself particularly in the region of slip, i.e., when the first friction surfaces 230 and second friction surfaces 240 contact each other but have different rotational speeds.

It is in this situation that a significant amount of heat is generated in the region of friction surfaces 230, 240 which should be carried off via the fluid medium. When the rotational speeds are finally in equilibrium, i.e., when clutch arrangement 100 is engaged, substantially no new heat is generated so that it is not problematic if the conveying action subsides because of similarity of speeds between conveying component 340 on the one hand and the fluid medium on the other hand when it substantially rotates along with housing 110.

Sealing element 360 separates a second volume 740 from first volume 720. Further, second volume 740 is at least partially limited by a surface portion 750 of inner surface 220 of second housing shell 130 and of a rear piston face 760. Rear piston face 760 contacts a side of pressing element 620 remote of the piston surface 600.

If a pumping action is brought about due to a relative movement of conveying component 340 with conveying surfaces 330 thereof with respect to the fluid medium, there will be a drop in pressure in first volume 720 due to hydrodynamic effects. However, since sealing element 360 separates first volume 720 from second volume 740, the pressure present in second volume 740 can be maintained substantially constant regardless of a possible conveying action of conveying component 340, but at least a pressure drop possibly occurring due to other effects can be limited. In this way, even during a relative movement or pumping action due to conveying component 340, a force acting on the rear piston face 760 is not substantially affected by the conveying action and, therefore, by the movement of conveying component 340.

In other words, through the use of sealing element 360, a pressure present in second volume 740 can be maintained more constant such that upon actuation of pressing element 620 changes in pressure in the second volume brought about by introducing liquid volume into piston pressure space 590 or removing a liquid volume therefrom and, therefore, changes in force on the rear piston face 760 can be substantially eliminated, but at least reduced. By keeping the corresponding force on the rear piston face 760 more constant, it is possible to improve an engagement behavior, disengagement behavior or a definition of a particular slip situation at friction surfaces 230, 240 by controlling pressing element 620. Thus it may be possible to improve a controllability of the clutch arrangement 100 according to one embodiment through the use of the corresponding sealing element 360.

Depending on the specific embodiment of sealing element 360, it may be possible to reduce the size of second volume 740 or to increase the size of second volume 740 by changing a radial position of sealing element 360. However, the actual size of first volume 720 can be much less crucial than a position and/or a size of a surface portion of pressing element 620 which at least partially limits second volume 740.

During a rotation of clutch arrangement 100, centrifugal forces occur on the fluid medium located in second volume 740 and in piston pressure space 590. These centrifugal forces cause a pressure to build up which acts on pressing element 620 from both sides and which causes oppositely directed forces. Therefore, the radial position of sealing element 360 or the transitional area 790 thereof has an influence on whether or not an additional effective force is brought about on pressing element 620 due to the effect of centrifugal force because of changes in pressure, on the magnitude of this force and on the direction in which this force takes place.

For example, if transitional area 790 of sealing element 360 is displaced closer to axis of rotation 300 so that an extension of the surface portion of pressing element 620 along radial direction is reduced and second volume 740 is made smaller, the forces acting on pressing element 620 from second volume 740 are also smaller. Accordingly, a pressure acting in piston pressure space 590 due to centrifugal force leads to a greater effective force on pressing element 620 compared to the unaltered position of sealing element 360. The centrifugal forces occurring in piston pressure space 590 are therefore under-compensated.

Correspondingly, however, varying the location at which the transitional portion 790 is arranged also makes it possible to over-compensate for, or substantially fully compensate for, the centrifugal force pressure acting on pressing element 620. In this respect, it may be advisable that the pressure occurring in second volume 740 under the relevant circumstances due to centrifugal forces is dimensioned such that it is neither too large nor too small to impede or even prevent an engaging movement or disengaging movement of pressing element 620.

As has already been mentioned, sealing element 360 is further configured not only to fluidically separate first volume 720 from second volume 740, but is further configured to exert a force on pressing element 620 or another component part having an at least partially disk-shaped portion such that pressing element 620 returns to its starting position when not actuated. In other words, sealing element 360 is configured here in such a way that it exerts a force on pressing element 620 such that pressing element 620 is brought back to the starting position shown in FIG. 1 in which particularly the frictional engagement between the first friction surfaces 230 and second friction surfaces 240 is canceled or at least decreased to the extent that no significant torque is transmitted via clutch arrangement 100. In this case, the actuation of pressing element 620 is carried out by introducing a corresponding fluid volume through the inlet bore 650 to piston pressure space 590.

To enable this dual functionality of sealing element 360, sealing element 360 has a first sealing surface 770 and a second sealing surface 780 which are connected to each other through a transitional portion 790. First sealing surface 770 and second sealing surface 780 are both oriented substantially perpendicular to axis of rotation 300 and spaced apart along the latter. The two sealing surfaces 770, 780 are also spaced apart along radial direction, i.e., perpendicular to axis of rotation 300, second sealing surface 780 being arranged radially inwardly of first sealing surface 770 in the sealing element 360 shown in FIG. 1. Accordingly, transitional portion 790 has a conical outer surface shape. The arrangement of the two sealing surfaces 770, 780 along radial direction can also be switched in other embodiment examples.

The two sealing surfaces 770, 780 lie on corresponding planes or annular portions of housing 110 or second housing shell 130, respectively, and pressing element 620. Depending on the specific embodiment, these sealing surfaces 770, 780 may be surface-treated, i.e., for example, turned, to form corresponding counterpart sealing surfaces.

When a deformation of sealing element 360 is brought about due to a movement of pressing element 620, this results, not least, in a deformation of transitional portion 790, and there is initially a tendency for an area-type support because of the flat configuration of the two sealing surfaces 770, 780 even in the event of a deformation of the same or a change in the geometrical orientation of the same relative to pressing element 620 and second housing shell 130. However, a lifting off or rolling off of at least a portion of one of the two sealing surfaces 770, 780 can also come about depending on the degree of deformation of sealing element 360.

In this case, it may come about that the relevant sealing surfaces 770, 780 only contact the corresponding component part, i.e., pressing element 620 or second housing shell 130, in a line-shaped manner at least in some areas, but possibly also in all areas. Typically, however, there is always at least one line-shaped contacting area. Accordingly, even in case of a movement of pressing element 620, a sealing action of sealing element 360 can be at least partially maintained.

Moreover, to better secure sealing element 360 to second housing shell 130, sealing element 360 has at a side remote of transitional portion 790 a portion which is adapted to a shape of second housing shell 130 so that in this way a positive engagement connection is formed in radial direction and in axial direction, i.e., along axis of rotation 300. This positive engagement connection may also be configured only as an aid to assembly or as a centering aid for sealing element 360.

In addition or alternatively, the portion, also referred to as collar or edge, can also be provided for mechanical stabilization of sealing element 360. Accordingly, a deformation of sealing element 360 in circumferential direction during a displacement of pressing element 620 along axis of rotation 300 may be reduced or completely prevented by this portion. For example, corrugations along the circumferential direction can occur under corresponding loads. Also, the shapes of sealing element 360 and of second housing shell 130 need not be adapted in the manner described above.

Accordingly, in one embodiment of a clutch arrangement 100 shown in FIG. 1, sealing element 360 serves not only for the fluidic separation of first volume 720 and second volume 740, but also carries out the additional function of returning pressing element 620 to a starting position before an actuation of the same so that clutch arrangement 100 is, in particular, a normally open clutch arrangement. Sealing element 360 may also be reinforced where applicable by an additional corresponding spring element, for example, in the form of a supplementary disk spring, diaphragm spring, leaf spring or coil spring.

In other embodiment examples, sealing element 360 can also exert a force on pressing element 620, or another component part, such that clutch arrangement 100 is a normally closed clutch arrangement in which there is a frictional engagement between first friction surfaces 230 and second friction surfaces 240 without an actuation. In other words, sealing element 360, which is also referred to as sealing plate, can be not only pre-loaded in compression as is shown in FIG. 1 but also pre-loaded in tension. In this way, a normally closed clutch arrangement can be realized, for example.

The clutch arrangement 100 shown in FIG. 1 is a three-line type in which the inlet bore 650 is one of the three lines or channels by which piston pressure space 590 can be charged with the fluid medium, possibly also with a different fluid medium. To enable a movement of pressing element 620, second volume 740 is fluidically connected via a feed channel 800, shown in dashes in FIG. 1, which leads into a feed 810 to second volume 740. In this case, feed channel 800 opens into an inlet region 820 which is guided along the transmission input shaft, not shown in FIG. 1. Feed channel 800 and feed 810 allow the fluid medium to flow in and out when there is a movement of pressing element 620. Accordingly, they serve to compensate for the corresponding volume.

Inlet region 820 is connected to an inlet for the fluid medium, i.e., for the oil or transmission oil, via several tooth voids in the internal toothing 210 and corresponding external toothing of the transmission input shaft. One, two, or more adjacent teeth are frequently omitted in the region of internal toothing 210 and the corresponding external toothing of the transmission input shaft, not shown in FIG. 1, at a plurality of locations along the circumference of the corresponding teeth so that oil passage conduits are formed at these locations which fluidically couple the inlet region with the transmission. Specifically, two adjacent teeth are missing from the relevant toothing at three locations in one embodiment shown in FIG. 1 to form the oil passage conduits.

Not only is second volume 740 supplied with fluid medium via inlet region 820, but partial volume 730 is also fluidically connected via inlet region 820 and oil guide conduits integrated in bearing 565. In other words, the oil flows in through internal toothing 210 and the corresponding external toothing of the transmission input shaft, inlet region 820 and the oil guide channels of bearing 565. The inlet bore 650 to piston pressure space 590 is separated from inlet region 820 by a seal, also not shown in FIG. 1. Accordingly, inlet region 820 constitutes the second line.

The fluid medium can exit partial volume 730 via corresponding oil guides or oil guide channels in bearing 550 and an outlet region 830. Outlet region 830 is formed between lower hub 200 and a pump hub 840 and has a substantially annular cross section. Pump hub 840 is sealed relative to lower hub 200 using a sealing element 850. The fluid medium which has entered outlet region 830 can then be discharged via an opening 860, also referred to as oil discharge. In the clutch arrangement 100 shown in FIG. 1, the opening 860 is connected to the sump of the transmission or also to another receptacle for the oil or fluid medium. Accordingly, together with outlet region 830, opening 860 forms the third line.

In many cases, the conveying volume which can be circulated through conveying component 340 with its conveying surfaces 330 in the interior of housing 110 is many times greater than a volume which is supplied to and removed from housing 110 via inlet region 820 and outlet region 830, respectively. Accordingly, a volume flow is often generated using conveying surfaces 330 of conveying component 340, but also using other structures in the interior of housing 110 which assist in conveying the fluid medium.

This volume flow can be at least five times, at least ten times, at least fifteen times, or at least twenty times the volume of fluid medium made available through inlet region 820 of clutch arrangement 100, but may also be smaller than these values. The ratios indicated in this respect refer to a maximum amount conveyed by conveying component 340. These conveying surfaces 330 generating a forced flow in the respective housing 110 which is filled with fluid and which rotates around the axis of rotation make use of precisely the effect of different rotational speeds at the drive side and driven side of clutch arrangement 100, i.e., the different rotational speeds at drive component 150 and output component 190. Conveying surfaces 330 act like an impeller with respect to the circulation of the fluid medium or like a turbine in a hydroclutch or hydrodynamic torque converter.

Pump hub 840 is connected to first housing shell 120 of housing 110 via a weld 870. Second housing shell 130 is also connected to front hub 580 via a weld 880 so that, in connection with weld connection 140 which may be formed, for example, as a weld seam and connects the two housing shells 120, 130, a closed volume is formed with partial volume 730 and with first volume 720 and second volume 740.

The corresponding welds 870, 880 and 140 can be formed as weld seams or as spot welds. These connection techniques can also be exchanged for other connection techniques which are adapted and suited to the conditions of use.

FIG. 1 further shows a balance weight 890 which is welded to first housing shell 120 in the present case. It serves to compensate for imbalances induced by design or assembly or from other causes and can thus reduce corresponding imbalances in the drivetrain of the vehicle. However, the position of the balance weight shown in FIG. 1 can vary in other embodiment examples.

Further, a spacer disk 900 is inserted between the feed 810 formed as part of front hub 580 and the housing 110, more accurately the second housing shell 130. As will be described briefly in the following, this spacer disk 900 serves to adjust a clearance between the plates, i.e., to adjust the clearance between first friction surfaces 230 and second friction surfaces 240. The clearance between friction surfaces 230, 240 determines the capacity of clutch arrangement 100 to interrupt the torque flow on the one hand and a response behavior during engagement and disengagement of clutch arrangement 100 on the other hand.

While clearances S tending to be larger are specified in the interest of a reliable separation of friction surfaces 230, 240 and, therefore, in the interest of a reliable separation of the torque flow, these clearances S must be bridged by pressing element 620 in case of engagement and disengagement. Accordingly, it is precisely during a controlled engagement of clutch arrangement 100 that a delayed formation of the frictional engagement can come about, since the clearance must be bridged by pressing element 620 beforehand. Therefore, an adjustment of the clearance of the plates may improve a relationship between a response behavior of the clutch on the one hand and wear of first friction surfaces 230 and second friction surfaces 240 and a separability of clutch arrangement 100 on the other hand.

To this end, clutch arrangement 100 according to one embodiment has the spacer disk 900 which was described above. Spacer disk 900 can be adapted—within corresponding acceptable tolerance ranges—to the respective component dimensions of inner plates 270, outer plates 250, friction facings 260 and the other components which may be provided and which have an influence on the plate clearance S. In this respect, the plate clearance can be carried out based on previously measured component dimensions as well as in the course of a (partial) assembly of clutch arrangement 100 and a corresponding determination or measurement of the plate clearance along axis of rotation 300.

When the plate clearance S has been determined in one of the ways described above, an appropriate spacer disk 900, for example, from a set of ready-made spacer disks, can then be inserted. This spacer disk may also be machined individually. After insertion of the corresponding spacer disk 900, housing 110 of clutch arrangement 100 can then be closed, for example, by the welds 870, 880, 140 shown in FIG. 1, after assembly is finished.

Further, spacer disk 900 can also be implemented as a two-part or multi-part solution. In the two-part or multiple-part solution of the spacer disk, this spacer disk can comprise a first spacer disk component part and a second spacer disk component part which at least partially have a wedge-shaped profile along the circumference thereof. In this way, by rotating the two spacer disk component parts relative to each other, a thickness of the spacer disk along axis of rotation 300, i.e., along axial direction, can be changed by rotating the two parts relative to each other. The corresponding profiles can also be implemented directly at the components so that spacer disk 900 possibly need not be implemented.

By inserting a two-part or multiple-part spacer disk of this kind, i.e., a spacer disk 900 with a plurality of spacer disk component parts, the plate clearance S between friction surfaces 230, 240 can be adjusted by rotating second housing shell 130 relative to front hub 580 in case of the installed position of spacer disk 900 shown in FIG. 1.

In one embodiment of a clutch arrangement 100 shown in FIG. 1, second housing shell 130 has a planar portion 910 at an outer surface of housing 110 to which the weld bolt is fastened for fastening clutch arrangement 100 or for fastening housing 110 to a flexplate of an engine or other drive unit. To this end, weld bolt 160 is connected to the planar portion 910 of housing 110 by a weld 920. However, housing 110 or second housing shell 130 has at the inner surface 220 facing the inner volume a recess 930 in this area so that second housing shell 130 has a smaller material thickness in this area than in other areas.

This makes it possible to configure the support 390 for outer plates 250 in such a way that support 390 projects into recess 930. In this way, outer plate 250-1 can also be constructed as a planar disk without the risk of portion 370-1 or further driver surface 380-1 touching the housing 110 even under adverse operating conditions. Accordingly, an outer plate 250-1 identical to outer plate 250-2 can be used without having to take special measures in the area of portion 370 or allow for other features of the design thereof.

A recess 930 of this type which is located opposite a planar portion 910 at housing 110 can be carried out, for example, by providing a so-called S-stroke in the area of second housing shell 130. The S-stroke can be provided along the entire circumference, whereas planar portion 910 can be restricted to narrow spatial areas along the circumferential direction in which a connection to weld bolt 160 is to be made. Once the S-stroke has been introduced in second housing shell 130, planar portion 910 can be provided by pressing in second housing shell 130 in the area of the planar portion 910 to be generated. The material penetrating into the interior of housing 110 in so doing, i.e., the material penetrating the inner surface 220 of second housing shell 130, can then be removed, for example, by turning or by some other cutting method, to form recess 930.

The step, described with reference to FIG. 1, of generating planar portion 910 for receiving weld bolt 160 or another stud for fastening the clutch arrangement to a drive unit or other unit may be useful or necessary, for example, in a clutch arrangement 100 in which a particular position of the drivetrain or components thereof is necessary. The clutch arrangement 100 shown in FIG. 1, for example, is one determined for transverse installation, i.e., for mounting transverse to the longitudinal axis of the vehicle. However, embodiment examples of a clutch arrangement of this type are in no way limited to such clutch arrangements. On the contrary, they can also be utilized for longitudinally installed engines and gear units.

Merely in the interest of thoroughness, it should be mentioned here again that pressing element 620 is not coupled with housing 110 by a positive engagement connection. That is, if the non-positive or frictionally locking connection brought about by piston tongue 690 and other components is overcome, pressing element 620 is "freely" rotatable relative to housing 110. A situation of this kind can occur, for example, when there is an abrupt change in rotational speed without a renewed engagement of clutch arrangement 100. Examples of this include braking the vehicle to a standstill (standstill of the output component 190) starting from a high engine speed, to name only one example. In a situation of this kind, the free rotatability of pressing element 620 may lead to noise development from the region of clutch arrangement 100, which may be perceived by the driver as annoying, for example.

Figure 2:
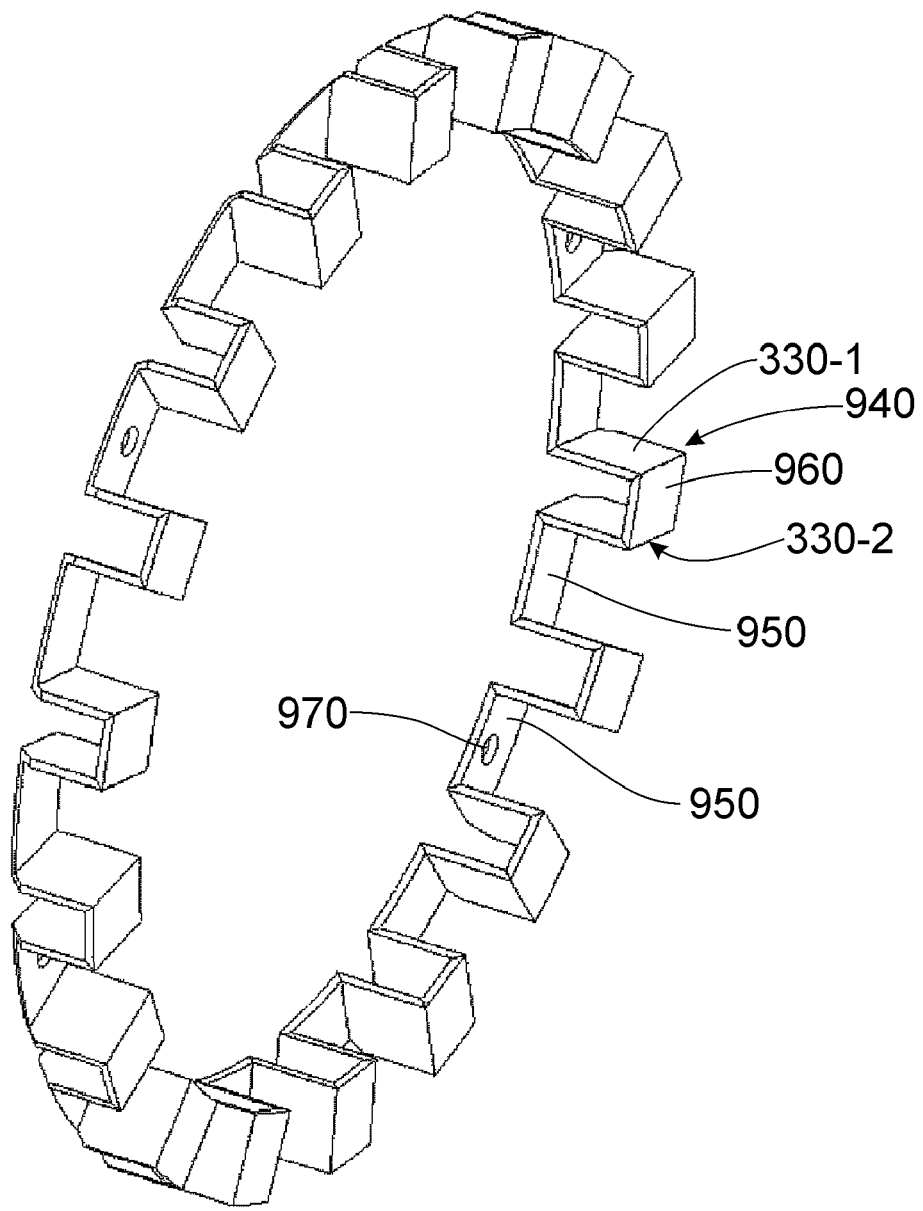
FIG. 2 shows a perspective view of the conveying component of the clutch arrangement from FIG. 1.

FIG. 2 shows a three-dimensional view of conveying component 340 as it is used in clutch arrangement 100 in FIG. 1. Conveying component 340, also referred to as plate driver, is constructed substantially as a complete ring, i.e., annularly, but can also be implemented based on conveying component segments. Conveying component 340 has a plurality of teeth 940 which are uniformly arranged along the circumference of conveying component 340 and which project above ring-segment-shaped portions 950 of conveying component 340. Teeth 940 are arranged at regular, equally spaced intervals.

Each of the teeth, only one of which is identified by a reference numeral in FIG. 2, has substantially two tooth flanks which extend perpendicular to portion 950 and form conveying surfaces 330. In the tooth identified in FIG. 2 as tooth 940, the two conveying surfaces 330-1 and 330-2 are joined to each other by a top surface 960.

As has already been mentioned in connection with FIG. 1, conveying component 340 in one embodiment shown therein is connected to housing 110, i.e., to the cover of clutch arrangement 100, via rivet connection 350. For guiding the rivet, conveying component 340 has at some portions 950 corresponding openings 970 through which the rivet connection to housing 110 or second housing shell 130 is provided. Specifically, the conveying component shown in FIG. 2 has a total of six openings 970 which are evenly distributed along the circumference of conveying component 340. In some embodiments, a different quantity of openings 970 can be implemented and can be arranged in an evenly or irregularly distributed manner.

In this case, conveying component 340 is formed integral, i.e., is fashioned from exactly one contiguous piece of material. Apart from the starter material piece and the openings 970, conveying component 340 has been produced by deforming a sheet-like workpiece. Accordingly, a comparatively simple and, therefore, inexpensive production method can be used. In other embodiment examples in which the requirements may be more exacting with respect to loads or for other constraints, a different production method may appear more reasonable, and cutting production methods or casting production methods can be used to provide the corresponding conveying component 340.

In the multiplate clutch arrangement shown in FIG. 1, the driving of plates 270, i.e., also of first component 280, is realized using the meander-shaped element, namely, conveying component 340. As is shown in FIG. 2, conveying component 340 can be implemented as a one-part solution or as a plurality of segments. In this case, conveying surfaces 330 generate the internal oil circulation, but serve at the same time to drive the plates.

As was shown in FIG. 1, conveying component 340 can be arranged on the engine side at the cover of the housing, i.e., at second housing shell 130, using rivets or other connection techniques to transmit the torque of the engine to plates 270. Accordingly, one embodiment shown in FIGS. 1 and 2 shows a clutch arrangement 100 in which the plate driver is arranged at the cover side. Clutch arrangements 100 can be used for high torques of several hundred newton meters (Nm), but clutch arrangements 100 according to embodiment examples in which higher or lower maximum torques can be transmitted can also be implemented.

Figure 3:
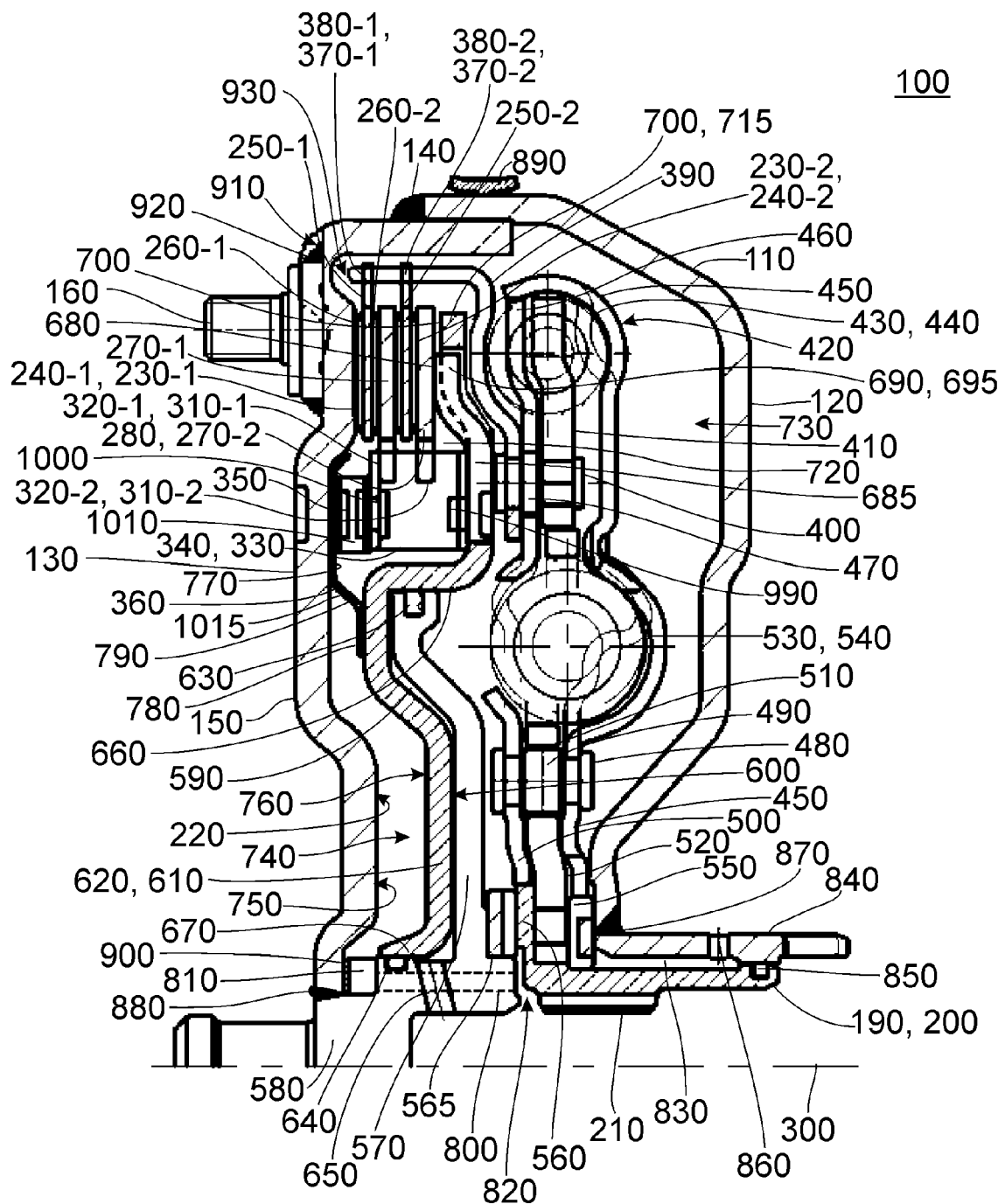
FIG. 3 shows a cross section through a further clutch arrangement in accordance with one embodiment of the present invention.

FIG. 3 shows a corresponding overall system of a clutch arrangement 100 according to one embodiment, but in which conveying component 340 is fastened on the piston side.

Accordingly, while the clutch arrangement 100 according to one embodiment shown in FIG. 3 still also has a sealing element 360, it is no longer directly connected to conveying component 340 via its rivet connection 350 which connects sealing element 360 to second housing shell 130 (cover). Rather, conveying component 340 is connected to pressing element 620 via a rivet connection 990 by positive engagement and, therefore, to be fixed with respect to rotation relative to it. Accordingly, for example, conveying component 340 can be connected by positive engagement to a plurality of leaf spring elements 1010 via additional rivet connections 1000, these leaf spring elements 1010 being implemented as part of sealing element 360. Leaf spring elements 1010 are formed out through a shaping of the material of sealing element 360 and are therefore fashioned integral with it. In other embodiment examples, however, leaf spring elements 1010 can also be fashioned as separate components or using other production methods in case they are formed integral with sealing element 360.

Since sealing element 360 is connected to the cover, i.e., second housing shell 130, to be fixed with respect to rotation relative to it via rivet connection 350, a substantially rotationally fixed connection results between the housing 110 serving as drive component 150 and the pressing element 620. In this case, therefore, sealing element 360 is also a connection component 1015. Accordingly, compared with the clutch arrangement 100 shown in FIG. 1, pressing element 620 is no longer "freely" rotatable but, rather, is connected to housing 110 in a substantially positively engaging manner. Therefore, even when there is an abrupt change in rotational speed without renewed engagement of clutch arrangement 100, a corresponding development of noise due to a freely rotating pressing element 620 will not occur in this implementation.

The connection between pressing element 620 and housing 110 can only be substantially rotationally fixed because torsion can occur between pressing element 620 and housing 110 due to, e.g., deformations, thermal effects or because of the geometric relationships given by the leaf spring elements 1010 during an axial displacement of pressing element 620. However, regardless of this, pressing element 620 follows the rotational movement of housing in one embodiment shown herein.

Accordingly, in the variant shown in FIG. 3, conveying component 340 is arranged on the piston side, a connection to the second housing shell 130 serving as cover being carried out using leaf spring elements 1010 to transmit the torque of the engine to inner plates 270 via conveying surface 330. The leaf springs or leaf spring elements 1010 accordingly provide the connection of conveying component 340 to the engine-side second housing shell 130. The leaf spring elements 1010 project into first volume 720 so that during a rotation of housing 110 and, therefore, during a rotation of conveying component 340 relative to the fluid medium in the interior of housing 110, these leaf spring elements 1010 likewise reinforce the conveying of fluid and, therefore, the generation of the flow of the fluid. Leaf spring elements 1010 also reinforce the conveying of oil.

Whereas, for the most part, rivet connections 990, 1000, 350 were discussed heretofore, other connection techniques can also be used to produce the corresponding substantially rotationally fixed connection between housing 110 and conveying component 340. For example, the corresponding rivet connections can also be individually or collectively replaced by or supplemented by a different connection technique, for example, a plug-in connection, but also by other positive, frictional and/or bonding connections.

In a corresponding embodiment example, the use of leaf spring elements 1010 can also be substituted by other components provided that they also reinforce, or at least do not hinder, an axial displacement of pressing element 620, i.e., along axis of rotation 300.

Figure 4:
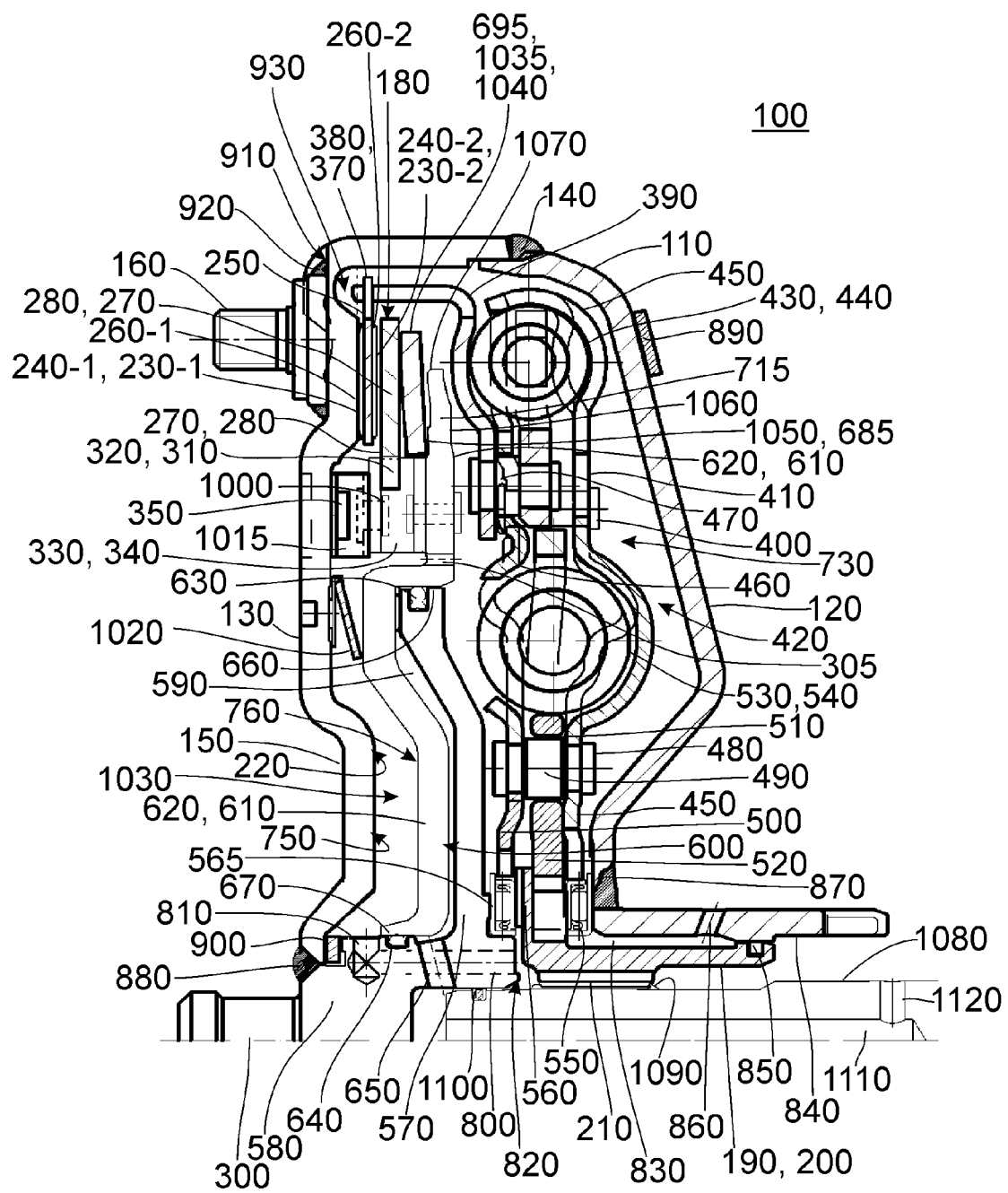
FIG. 4 shows a cross section through a further clutch arrangement in accordance with one embodiment of the present invention.

FIG. 4 shows another embodiment of a clutch arrangement 100 according to one embodiment. The clutch arrangement 100 from FIG. 4 differs from the clutch arrangement shown in FIG. 3 with respect to some components which will be mentioned in the following. However, the differences between the two clutch arrangements 100 are negligible with respect to the further components.

It should be noted first that the clutch arrangement 100 shown in FIG. 4 has a smaller quantity of inner plates 270 and outer plates 250. Specifically, clutch arrangement 100 has only one outer plate 250 and one inner plate 270. Inner plate 270 which represents component 280 engages with conveying surface 330 of conveying component 340 again via its driver surface 320 of portion 310. Correspondingly, conveying component 340 is constructed to be shorter with respect to its dimension along axis of rotation 300, i.e., along axial direction.

Beyond this, clutch arrangement 100 differs further from the clutch arrangement shown in FIG. 3 in that the two bearings 565, 550 enabling the axial guidance of output component 190, i.e., lower hub 200, are constructed as needle bearings in this clutch arrangement 100. Other axial and/or radial rolling bearings or friction bearings or combinations thereof can also be used in other embodiment examples.

The clutch arrangement 100 from FIG. 4 differs further from that shown in FIG. 3 in that second housing shell 130 now overlaps first housing shell 120 in the region of weld connection 140, i.e., outwardly limits clutch arrangement 100 or housing 110 thereof. Correspondingly, the balance weight 890 is also no longer positioned to be located on the radially outer side, but is arranged at a side of housing 110 remote of the weld bolt 160.

The clutch arrangement 100 from FIG. 4 differs further from that in FIG. 3 in that, instead of sealing element 360, a disk spring 1020 is arranged between second housing shell 130 and pressing element 620. Like sealing element 360 in FIG. 3, disk spring 1020 is pre-loaded in compression so that in this case again the clutch arrangement 100 according to one embodiment is a normally open clutch arrangement. In contrast to sealing element 360, disk spring 1020 is not a sealing element, so that the first volume 720 and second volume 740 shown in FIG. 3 form a collective volume 1030. Spring elements other than disk spring 1020 can also be used in other embodiment examples. For example, they can be replaced by a diaphragm spring, an arrangement of helical springs or another spring element. Moreover, in other embodiment examples disk spring 1020 or the spring element replacing disk spring 1020 can also be pre-loaded in tension. Accordingly, this clutch arrangement 100 according to one embodiment can also be a normally closed clutch arrangement.

In this embodiment example, a connection component 1015 serves to provide the substantially rotationally fixed connection to conveying component 340, this connection component 1015 being mechanically connected via rivet connection 350 to the cover, i.e., second housing shell 130, to be fixed with respect to rotation relative to it. However, other connection techniques may also be used instead of this in other embodiment examples.

The connection component 1015 has a plurality of leaf springs 1010 which provide the substantially rotationally fixed connection to conveying component 340 in the manner already described in connection with FIG. 3. To this end, connection component 1015 or leaf springs 1010 thereof are connected mechanically via further rivet connections 1000 to conveying component 340 to be fixed with respect to rotation relative to it. However, other connection techniques can also be used in this case.

The pressing element 620 in the clutch arrangement 100 shown in FIG. 4 is also constructed differently. While pressing element 620 again has a piston 610, it additionally comprises a separate spring element 1035 as spring structure 695. In the present case, spring element 1035 is implemented as a contact disk spring 1040. Spring element 1035 is arranged and formed such that it transmits the force (pressing force) necessary for producing the frictional engagement at least partially to component part 280 or, specifically, to the side (back side) of component part 280 remote of first friction surface 230. In this instance, component part 280 is the inner plate 270.

The contact disk spring 1040 is configured in this instance as a substantially annular structure. It contacts inner plate 270, i.e., component part 280, at a region that is closer to the outer radial end of contact disk spring 1040, while it is supported at a shoulder 1050 of piston 610 at a radially inner region of contact disk spring 1040. In this case, the connection portion 685 between spring structure 695 and pressing structure 715 comprises shoulder 1050, and the spring structure 695, as separate spring element 1035, is connected to piston 610 by positive engagement via connection portion 685. This results in a first and a second distance or gap S1 and S2, not shown in FIG. 4. First distance S1 extends at the level of connection structure 685 between spring structure 695 (spring element 1035) and component part 280 in a substantially relaxed condition of spring structure 695 in which spring structure 695 touches component part 280 and connection portion 685, i.e., is connected to the latter by positive engagement. First distance S1 accordingly extends between contact disk spring 1040 in the region of shoulder 1050, i.e., at a radially inner region or at the level of connection structure 685, in relation to inner plate 270.

In this case, shoulder 1050 of piston 610 extends only over a small radial area adjoined radially outwardly by a collar structure 1060 with a projection 1070. Projection 1070 is frequently the point of collar structure 1060 closest to contact disk spring 1040. In the neutral position of pressing element 620, i.e., in the substantially relaxed condition of spring structure 695, projection 1070 has the smallest second distance or gap S2 from contact disk spring 1040 along axial direction, i.e., along axis of rotation 300, which does not exceed gap S1. Further, projection 1070 has a distance from axis of rotation 300 perpendicular to the latter which is greater than the dimension of shoulder 1050 along radial direction but which does not exceed an outer diameter of contact disk spring 1040.

In other words, since gap S2 does not exceed gap S1 and might be smaller than gap S1, piston 610 contacts contact disk spring 1040 via projection 1070 substantially at the level of the friction radius. Accordingly, the location of the pressing pressure can be defined or fixed using a corresponding collar radius dimension. More accurately, projection 1070 forms a pressing line or line-shaped contact with spring structure 695 in view of the substantially rotational configuration of piston 610 and a tapering shape along radial direction.

Because gap S2 is smaller than gap S1, piston 610 contacts the friction radius or contact disk spring 1040 in the region of the friction radius. Using a corresponding dimensioning of the collar radius value, the location of the pressing pressure of the pressing structure 715 at spring structure 695 can be precisely defined. Accordingly, the location of the pressing pressure of first friction surfaces 230 and second friction surfaces 240 can also be determined. Thus it is also possible in this embodiment example to realize a friction radius limiting with respect to a facing springing action as is made apparent by the specific piston shape. In some embodiments described in connection with FIG. 1 and FIG. 3, the piston shape with piston tongues 690 served for this purpose.

In one embodiment shown here, the force (pressing force) necessary for producing the frictional engagement is transmitted to component part substantially completely by spring structure 695 in that the pressing structure 715 of piston 610 directly and immediately contacts spring element 1035 at a side remote of component part 280.

Accordingly, if pressing element 620 is now actuated so that piston 610 moves in direction toward friction surfaces 230, 240, contact disk spring 1040 generates or strengthens the force exerted on inner plate 270. In so doing, due to the structure of contact disk spring 1040, a deformation of the latter is brought about so that the contact disk spring 1040 is slightly deformed and "rolls along" the inner plate 270. This may bring about a slight shift in the distance of the maximum force acting on inner plate 270. Due to the configuration of friction pack 180, the point of the maximum pressing force approximately corresponds to a radius at which the greatest pressing forces occur in the region of friction facings 260. This radius again forms the friction radius.

If piston 620 is moved farther so that projection 1070 comes in contact with contact disk spring 1040, i.e., when gap S2 is bridged, the radial distance of the projection 1070 from axis of rotation 300 defines the position of the friction radius. In this way, the latter can be defined in a more deliberate manner, which may result in reduced wear, an irregular wear and/or an improved dissipation of heat by the fluid medium flowing through friction surfaces 230, 240. This increases the number of additional component parts only slightly compared with the embodiment of the pressing element 620 shown in FIGS. 1 and 3 because of the additional implementation of contact disk spring 1040.

Different geometries of the collar structure with projection 1070 can also be implemented in other embodiment examples. For example, instead of a projection 1070 with a line-shaped area of contact with spring structure 695, a projection 1070 with a surface area type contact can also be provided. Likewise, a diaphragm spring can also be used as spring element 1035 instead of contact disk spring 1040.

FIG. 4 further schematically shows the previously mentioned transmission input shaft 1080 with its external toothing 1090 which meshes with the internal toothing 210 and which makes possible the rotationally fixed connection to lower hub 200, i.e., output component 190. As has already been mentioned, external toothing 1090 is missing some teeth to allow the fluid medium to flow through to the inlet region 820.

Further, FIG. 4 shows a groove with a sealing element 1100 which extends in circumferential direction around transmission input shaft 1080 between inlet region 820 and inlet bore 650 of piston pressure space 590. This groove contacts front hub 580 and seals off inlet region 820 from inlet bore 650. Transmission input shaft 1080 further has an inlet channel 1110 which is oriented symmetrically and along axis of rotation 300 so that inlet bore 650 and, therefore, piston pressure space 590 can be supplied with fluid medium. Inlet channel 1110 can be supplied with fluid medium for filling piston pressure space 590 via a connection bore 1120.

In one embodiment of a clutch arrangement 100 shown in FIG. 4, a separate contact disk spring 1040 is used as spring element 1035 or spring structure 695, and a special piston skirt shape is used as pressing structure 715 with a defined distance S2 from contact disk spring 1040, which defined distance S2 is generally smaller than first distance S1 between the steel plate (component part 280) and contact disk spring 1040 in the region of shoulder 1050 to realize the improvement in the friction radius at friction facings 260.

Figure 5:
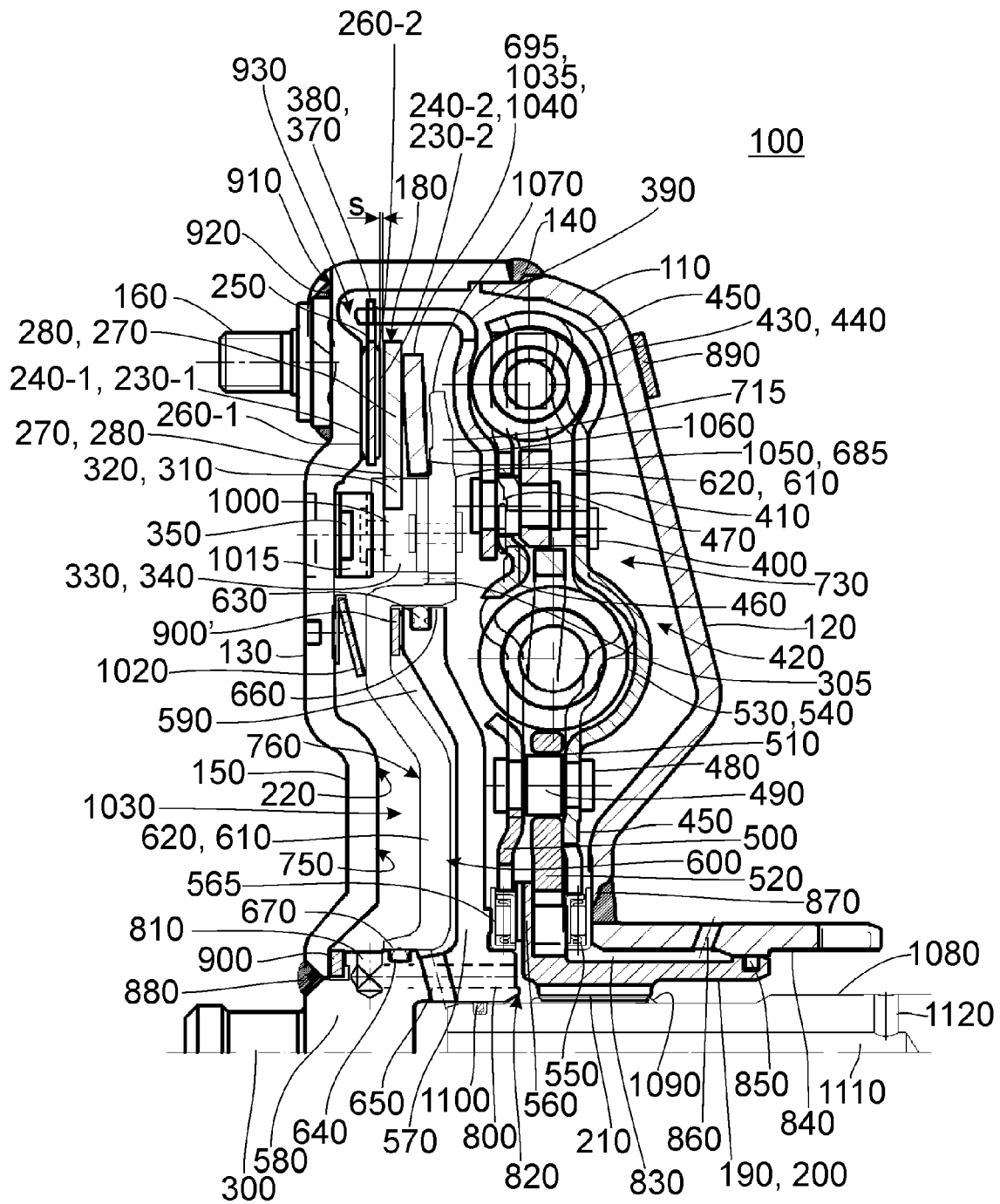
FIG. 5 shows a cross section through a further clutch arrangement in accordance with one embodiment of the present invention.

FIG. 5 shows one embodiment of a clutch arrangement 100 according to one embodiment in which an additional spacer disk 900' is integrated in addition to the spacer disk 900 which has already been shown. The further spacer disk 900' can likewise be implemented in one or more parts as has already been described. Spacer disk 900' is arranged between dividing wall 570 and piston 610 or pressing element 620 in the region of piston pressure space 590. Accordingly, the plate clearance S can also be varied by varying the position of piston 610. Accordingly, together with spacer disk 900, the plate clearance S can be varied by varying the distance of second housing shell 130 or by varying the distance of piston 610.

It is certainly not necessary to implement both spacer disks 900, 900' simultaneously. A corresponding adjustment of plate clearance S can be realized already in implementing an individual spacer disk 900 or both spacer disks 900 without increasing the installation space needed for clutch arrangement 100. On the contrary, the use of an individual spacer disk 900 or 900' and the use of both spacer disks 900, 900' make it possible to adjust plate clearance S and, in so doing, at the same time to reduce the necessary axial installation space for clutch arrangement 100 compared to conventional solutions.

Further, one embodiment of a clutch arrangement 100 shown in FIG. 5 does not differ from that shown in FIG. 4, and reference is had to the description of FIG. 4 in this respect.

Figure 6:
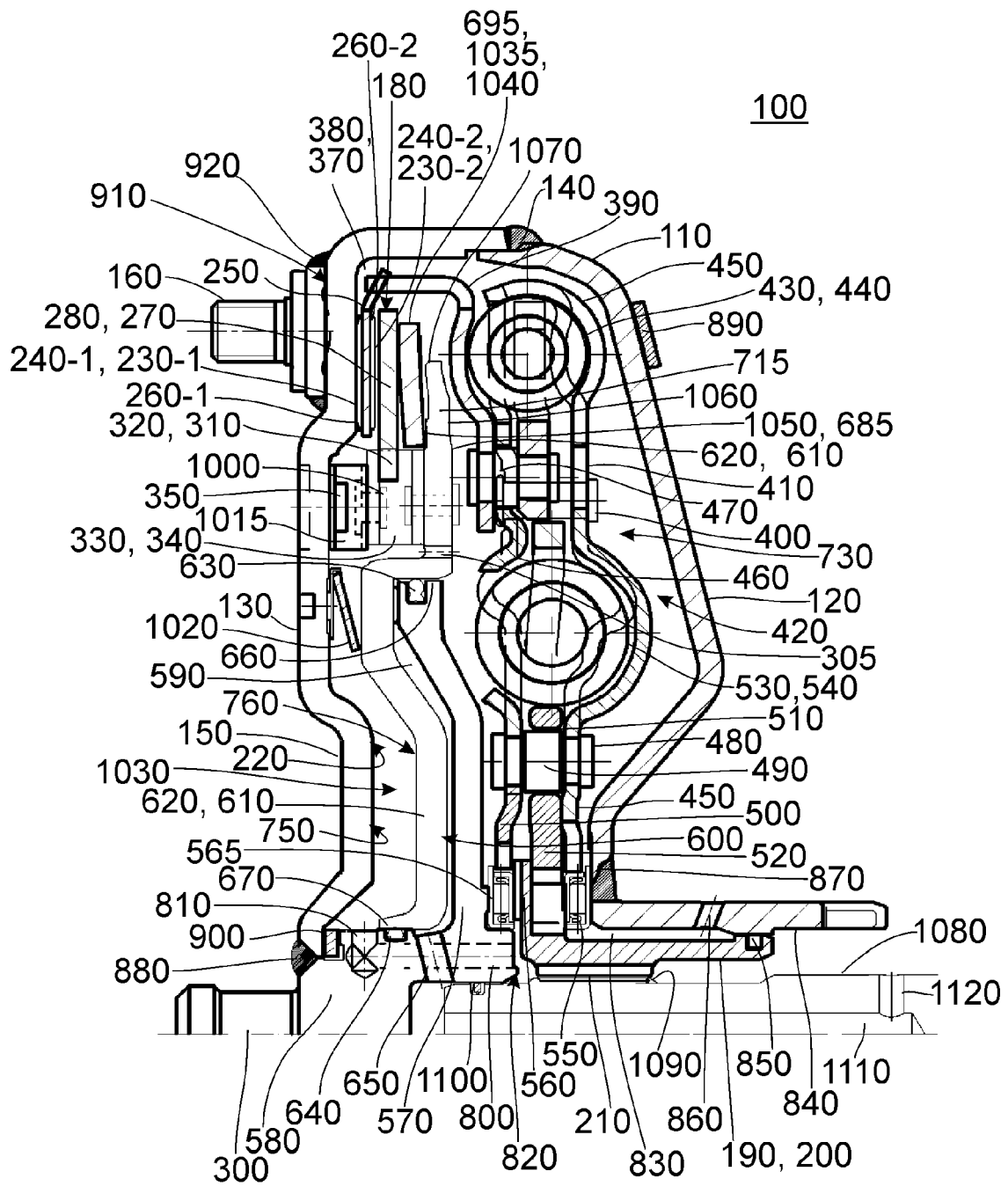
FIG. 6 shows a cross section through a further clutch arrangement in accordance with one embodiment of the present invention.

Finally, FIG. 6 shows a further variation of the clutch arrangement 100 shown in FIG. 4 which essentially differs from the latter in that recess 930 is not provided. Consequently, support 390 is shorter in axial direction so that portion 370 with the further driver surface 320 of outer plate 250 is angled, i.e., bent by a predefined angle away from second housing shell 130 relative to axis of rotation 300.

Apart from this variation, the clutch arrangement 100 from FIG. 6 also does not differ from the clutch arrangement 100 shown in FIG. 4.

Figure 7:
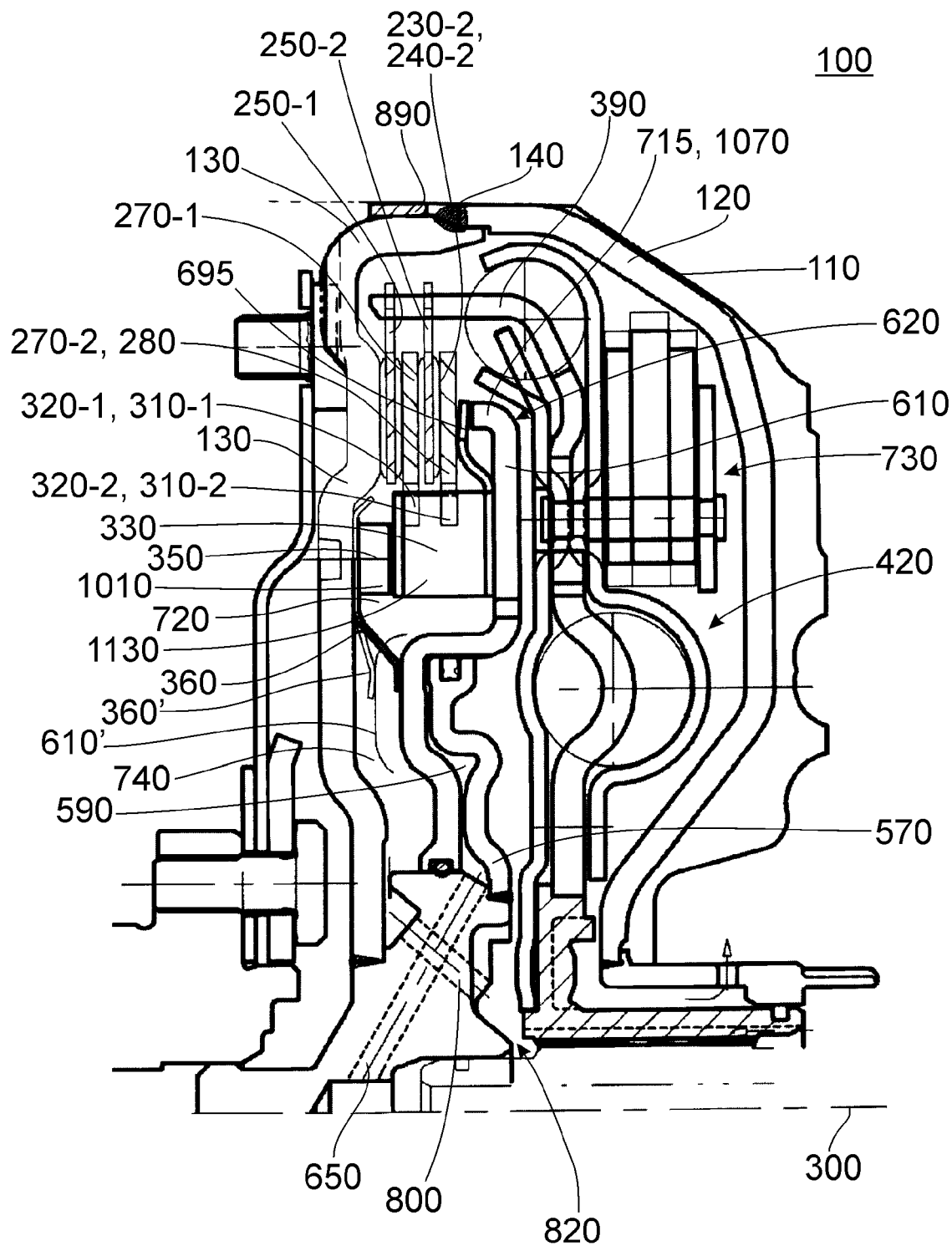
FIG. 7 shows a cross section through a further clutch arrangement in accordance with one embodiment of the present invention.

FIG. 7 shows a cross section through a further clutch arrangement 100 according to one embodiment which differs in a number of details from the clutch arrangement 100 shown in FIG. 3. For example, the clutch arrangement 100 in FIG. 7 guides the fluid medium into second volume 740 in a different manner. Feed channel 800 extends from inlet region 820 to second volume 740 obliquely with respect to axis of rotation 300. The arrangement of inlet bore 650 to piston pressure space 590 is also different.

Further, balance weight 890 is also no longer arranged on first housing shell 120 but rather on second housing shell 130 which extends outwardly less far along radial direction than first housing shell 120. Accordingly, balance weight 890 is arranged adjacent to weld connection 140 such that it is substantially aligned with an outer diameter of first housing shell 120.

The exact configuration of vibration damper 420 also differs from the vibration damper 420 shown in FIG. 3. However, the two vibration dampers 420 from the two different clutch arrangements 100 do not differ with regard to their manner of functioning. The exact configuration of the dividing wall 570 which separates partial volume 730 from piston pressure space 590 also differs between the two clutch arrangements 100.

However, the two embodiment examples of a clutch arrangement 100 do not differ from each other as regards the arrangement and configuration of inner plates 270 and outer plates 250. The clutch arrangement 100 shown in FIG. 7 also has a sealing element 360 which separates first volume 720 from second volume 740. Sealing element 360 also has leaf spring elements 1010 in this case via which a substantially rotationally fixed connection is produced between second housing shell 130 and conveying surface 330 or conveying surfaces 330.

However, the two clutch arrangements 100 differ in particular with respect to the configuration of pressing element 620. The configuration of pressing element 620 resembles that of one embodiment of a clutch arrangement 100 shown in FIG. 7. Piston 610 of pressing element 620 likewise has a pressing structure 715 which has a projection 1070 extending substantially completely around axis of rotation 300. This projection 1070 is also referred to as a piston skirt by reason of its shape.

Projection 1070 is arranged at a region of pressing element 620 on the radially outer side; with respect to first friction surfaces 230 and second friction surfaces 240, this projection 1070 is arranged substantially in the region of a center of a common contacting surface of the two friction surfaces 230, 240, which contacting surface makes up the largest surface area and is at least ring-segment-shaped. In other words, projection 1070 is located along radial direction approximately at the height of the at least arcuate center line of the indicated contacting surface. The position of pressing structure 715 and the projection 1070 thereof can differ correspondingly in other embodiment examples.

In one embodiment of a clutch arrangement 100 shown in FIG. 7, pressing element 620 also comprises an additional component part 1130 which comprises the conveying surface 330 as well as spring structure 695. Further component part 1130 is formed in one piece as is described more fully referring to FIG. 8. Further component part 1130 is connected via leaf spring elements 1010 to second housing shell 130 to be substantially fixed with respect to rotation relative to it, this second housing shell 130 typically being arranged on the engine side. Further component part 1130 is also connected to piston 610 of pressing element 620 to be substantially fixed with respect to rotation relative to it, for example, by positive engagement and/or bonding connection.

Further, FIG. 7 shows a deformation of sealing element 360. Sealing element 360 passes into the position designated as position 360' when piston 610 of pressing element 620 moves into the position designated as position 610'. With regard to the further features of clutch arrangement 100, reference is made to the embodiment described above, particularly those in FIGS. 3 and 4.

Figure 8:
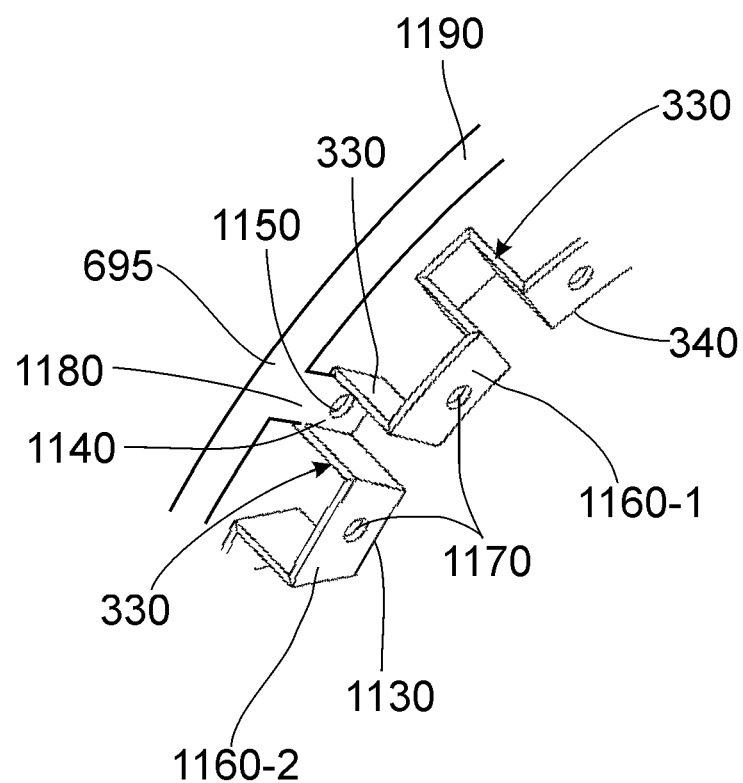
FIG. 8 shows a perspective view of an additional component part and of a conveying component of the clutch arrangement from FIG. 7.

FIG. 8 shows a perspective view of further component part 1130 and a conveying component 340 which is additionally implemented but which is not shown in the cross-sectional view in FIG. 7. Both conveying component 340 and further component part 1130 have in each instance at least one conveying surface 330 via which fluid medium in first volume 720 can be made to flow using a relative movement with respect to the fluid medium. The conveying component 340 is implemented here as an additional component part which comprises multiple parts, is composed of individual segments and is arranged along circumferential direction of clutch arrangement 100.

Between two conveying surfaces 330 which are adjacent but oriented in opposite directions along circumferential direction, further component part 1130 has in each instance a top surface 1140 similar to the top surface 960 of conveying component 340 from FIG. 2. In contrast to the top surface 960 shown in FIG. 2, however, top surface 1140 of further component part 1130 has an opening 1150 which faces first housing shell 110, i.e., the transmission side of clutch arrangement 100, and by which further component part 1130 can be arranged at piston 610 of pressing element 620. Correspondingly, further component part 1130 also has in each instance at a side facing first housing shell 120 and, therefore, facing the engine, a portion 1160-1, 1160-2 also having an opening 1170 in each instance, further component part 1130 being connectable to leaf springs 1010 of sealing element 360 on the engine side using openings 1170. Openings 1170 also allow further component part 1130 to be connected to conveying component 340 or segments thereof.

Other connection techniques apart from the rivet connections described above can also be used to connect the relevant component parts to one another or to other component parts. For example, aside from plug-in connections and other positive engagement connection techniques, bonding connections, e.g., welding, can be used alternatively or in addition.

Moreover, further component part 1130 has one or more connection portions 1180, only one of which is shown in FIG. 8. This connection portion 1180 adjoins top surface 1140 and connects it to a disk-spring type structure 1190. Specifically, in one embodiment shown in FIG. 8 the latter is connected to corresponding top surfaces 1140 of further component part 1130 via three connection portions 1180 which are spaced apart equidistantly along circumferential direction. In this case, connection portions 1180 serve to fix the position of the disk-spring type structure 1190 and, for this reason, are also referred to as centering portions. The disk-spring type structure 1190 extends substantially along the full circumference of clutch arrangement 100, i.e., along an angle of 360° in a closed circle. For this reason, disk-spring type structure 1190 is also referred to as disk spring base body.

In this case, disk-spring type structure 1190 is an embodiment form of a flexible spring structure which is part of spring structure 695. By implementing further component part 1130 together with one or more segments of conveying component 340, a multipart construction of a conveying structure and driver structure is achieved in which the spring effect of spring structure 695 can be integrated simultaneously.

Figure 9:
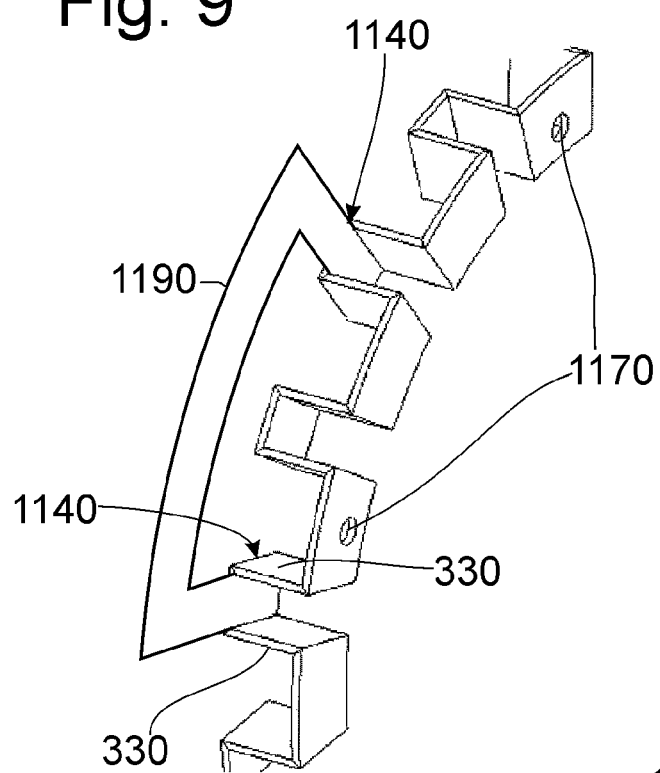
FIG. 9 shows a perspective view of a further embodiment form of the further component part of a clutch arrangement in accordance with one embodiment of the present invention.

FIG. 9 shows a perspective view of another embodiment form of further component part 1130 such as can be used in connection with the clutch arrangement 100 shown in cross section in FIG. 7. In this case, further component part 1130 is a substantially completely annular structure having a regular sequence of conveying surfaces 330 along the circumference of further component part 1130. In this case, conveying surfaces 330, which likewise serve to drive component part 280 and are therefore part of the teeth mentioned above, are oriented substantially perpendicular to the circumferential direction or tangential direction of further component part 1130 and, therefore, of clutch arrangement 100.

Moreover, further component part 1130 has a disk-spring type structure 1190 which is connected to top surfaces 1140 of further component part 1130 and extends radially outward. In this instance, disk-spring type structure 1190 is not connected to every top surface but rather only to every second top surface 1140 long circumferential direction. A larger or smaller number of cover surfaces 1140 can also be connected to disk-spring type structure 1190 in other embodiment examples.

In this case, further component part 1130 forms spring structure 695 of pressing element 620, and disk-spring type structure 1190 comprises a plurality of annularly shaped segments in the present instance. The quantity of openings 170 in further component part 1130 for fastening the same can be reduced because the further component part 1130 is formed to extend substantially completely along circumferential direction. FIG. 9 also shows openings corresponding to openings 1150, and further component part 1130 can be connected using a weld connection or other connection technique.

Figure 10:
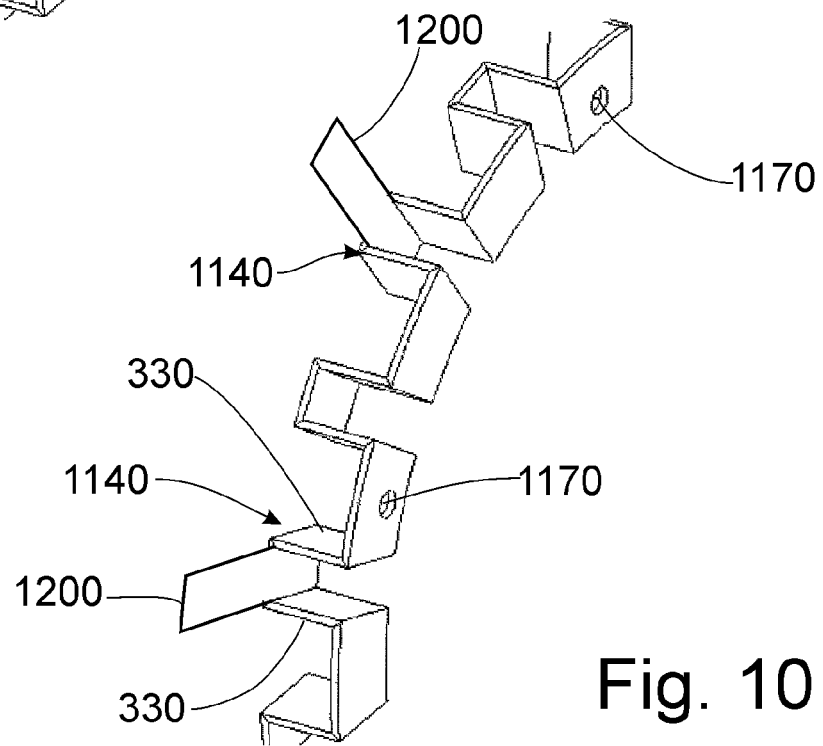
FIG. 10 shows a perspective view of a further embodiment form of the further component part of a clutch arrangement in accordance with one embodiment of the present invention.

Finally, FIG. 10 shows another embodiment form of further component part 1130 which again comprises spring structure 695. Instead of the disk-spring type structure 1190 shown in FIG. 9, further component part 1130 in this case has a plurality of leaf-spring type structures 1200 extending radially outward from top surfaces 1140.

FIG. 11 shows an additional embodiment of a spring structure 695 in connection with a conveying component 340 such as can also be used, for example, within the framework of a clutch arrangement 100 shown in FIG. 7. In this case, conveying component 340 which likewise serves for driving plates replaces the further component part 1130. FIG. 11 shows one embodiment in which spring structure 695 is again formed as disk-spring type structure 1190 but in which a plurality of tongues 1210 are arranged at an inner diameter of spring structure 695 to center the latter, these tongues 1210 contacting the lateral surfaces of conveying component 340 and accordingly allow spring structure 695 to be centered. In this case, spring structure 695 is constructed as contact disk spring 1040 which, however, has the tongues 1210 at the inner diameter thereof in addition to a conventional contact disk spring. Accordingly, spring structure 695 is constructed as a separate spring element 1035.

FIG. 12 shows a perspective view of a further implementation of a spring structure 695 in which a contact disk spring 1040 is again used as separate spring element 1035. The conveying element 340 used here comprises a plurality of tongues 1220 which are arranged radially outwardly at conveying component 340. Disk spring 1040 can again be centered in that tongues 1220 contact the radial limiting surface thereof. In this case also, conveying component 340 again serves to drive plates or, specifically, to drive inner plates 270.

Clutch arrangements 100 can be provided for different clutch applications, for example, for vehicles with an automatic transmission which is installed in the front area of the vehicle and constructed transverse to the driving direction. Clutch arrangements 100 according to one embodiment may be used as starting clutches, but also as separating clutches in connection with synchronized transmissions or in connection with longitudinally installed engines. Oil may serve as fluid medium, for example.

The embodiments described in the preceding paragraphs merely serve as an illustration of the principles of the present invention. It will be appreciated that modifications and variations of the arrangements and details described herein will be apparent to those skilled in the art. Therefore, it is intended that the invention be limited only by the protective scope of the appended patent claims and not by the specific details set forth herein in the description and explanation of the embodiments.

The invention claimed is:

1. A clutch arrangement for a drivetrain of a vehicle, comprising:
    a first friction surface and a second friction surface that are arranged to be movable relative to each other along an axis of rotation of the clutch arrangement, wherein the first and second friction surfaces are formed in a way that they can be brought into a frictional engagement with each other to make a torque transmittable from the first friction surface to the second friction surface, and wherein one of the first friction surface and the second friction surface is arranged at a component part; and
    a pressing element comprising a spring structure and configured to produce or sever the frictional engagement upon actuation by causing a force along the axis of rotation,
    wherein
    the spring structure is configured and arranged to at least partially cause the force on the component part through a change in shape,
    the pressing element further comprises a pressing structure that is formed such that the pressing structure limits a change in shape of the spring structure, and
    the spring structure and the pressing structure are formed such that the spring structure substantially completely transmits the force to the component part when the pressing structure limits the change in shape of the spring structure.

2. The clutch arrangement of claim 1, wherein the spring structure comprises one of a flexible spring structure, a leaf-spring type, disk-spring type, disk-spring-segment type, diaphragm-spring type, and diaphragm-spring-segment type structure that is configured to cause the force through a bending along the axis of rotation.

3. The clutch arrangement of claim 1, wherein the first friction surface and the second friction surface have a common contacting surface that is at least ring-segment-shaped and has the largest surface area, wherein the first friction surface and the second friction surface make a contact at the common contacting surface when the frictional engagement is present, and wherein the pressing structure is formed to limit the change in shape of the spring structure in a predefined condition of the clutch arrangement, thereby resulting in an effective friction radius which is at a distance from an at least arcuate center line of the contacting surface of at most 40% of a width of the common contacting surface.

4. The clutch arrangement of claim 1, wherein the pressing structure is formed such that the pressing structure comes in contact with the spring structure when the spring structure reaches a predetermined degree of shape change to limit the change in shape of the spring structure.

5. The clutch arrangement of claim 4, wherein the pressing structure has a projection which faces the spring structure and which is formed such that the pressing structure comes in contact with the spring structure with the projection.

6. The clutch arrangement of claim 1, wherein the pressing element further comprises a connection portion configured to form a mechanical connection between the spring structure and pressing structure, and wherein a first distance along the axis of rotation between the spring structure and the component part at the level of the connection structure corresponds at least to a shortest second distance between the pressing structure and the spring structure in a substantially relaxed condition of the spring structure in which the spring structure touches the component part and is connected to the connection portion.

7. The clutch arrangement of claim 1, wherein the spring structure is formed by a contact disk spring that functions as a separate spring element, and wherein the pressing element has a shoulder which is formed and arranged such that the contact disk spring contacts the shoulder to transmit force at least partially to the component part.

8. The clutch arrangement of claim 1, wherein the pressing structure is formed and arranged such that the pressing structure contacts the component part when the pressing structure limits the change in shape of the spring structure.

9. The clutch arrangement of claim 1, wherein the first friction surface and the second friction surface are configured to contact a fluid medium in operation, wherein the pressing element comprises a conveying surface for the fluid medium, and wherein the conveying surface is formed in such a way that it causes a flow of fluid medium during a rotation relative to the fluid medium.

10. The clutch arrangement of claim 9, wherein the pressing element is formed such that the conveying surface and the spring structure are formed integrally.

11. The clutch arrangement of claim 1, wherein the first friction surface and the second friction surface are configured to contact a fluid medium in operation and further comprise a conveying component having at least one conveying surface, and wherein the conveying surface is formed such that it causes a flow of fluid medium during a rotation relative to the fluid medium.

12. The clutch arrangement of claim 11, wherein the spring structure is formed by a contact disk spring that functions as a separate spring element, and wherein at least one of the conveying component and the contact disk spring is formed such that the contact disk spring can be centered via the conveying component.

13. The clutch arrangement of claim 9, wherein the conveying surface is formed and arranged such that it is a part of a toothing via which the first friction surface can be driven.

14. The clutch arrangement of claim 9, wherein the conveying surface is oriented substantially perpendicular to a tangential direction which is perpendicular to the axis of rotation and a radial direction facing away perpendicularly from the axis of rotation.

15. The clutch arrangement of claim 1, wherein the spring structure includes a first pressing surface and the pressing structure includes a second pressing surface, wherein the first pressing surface is arranged at a side of the spring structure facing the component part and is formed such that the first pressing surface contacts the component part and the force is at least partially caused via the first pressing surface whenever the pressing element produces the frictional engagement, and wherein the second pressing surface is arranged at a side of the pressing structure facing the component part and is formed such that the second pressing surface contacts the component part and the force is at least partially caused via the second pressing surface when the pressing structure limits the change in shape of the spring structure.

16. The clutch arrangement of claim 15, wherein the pressing element is formed such that a total area of the projections of the first pressing surface and the second pressing surface substantially completely comprises a projection of an overlapping area of the first friction surface and the second friction surface.

17. The clutch arrangement of claim 15, wherein the pressing structure and the spring structure are formed in one piece.

18. The clutch arrangement of claim 17, wherein the pressing structure and the spring structure are formed from a sheet-like component part, and wherein the spring structure is constructed by forming out of the sheet-like component part.

19. The clutch arrangement of claim 14, wherein the first pressing surface and the second pressing surface are formed in such a way that the pressing element contacts the component part along substantially the entire circumference thereof at the level of the effective friction radius thereof when the pressing structure limits the change in shape of the spring structure.

20. The clutch arrangement of claim 6, wherein the spring structure comprises piston tongues connected to the pressing element via the connection portion, wherein, to form the connection portion in the region of the first and second friction surfaces, the pressing element has, at the piston tongues, a first pressing surface that faces the first and second friction surfaces, the piston tongues being formed by cropping the pressing element.

* * * * *